(12) United States Patent
Fujii et al.

(10) Patent No.: US 8,712,235 B2
(45) Date of Patent: Apr. 29, 2014

(54) TRANSMISSION APPARATUS AND NETWORK PROTECTION METHOD

(75) Inventors: Yasuki Fujii, Kawasaki (JP); Ryoichi Mutoh, Kawasaki (JP); Toru Katagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 90 days.

(21) Appl. No.: 13/371,808

(22) Filed: Feb. 13, 2012

(65) Prior Publication Data

US 2012/0237201 A1 Sep. 20, 2012

(30) Foreign Application Priority Data

Feb. 14, 2011 (JP) ................................. 2011-028069

(51) Int. Cl.
*G02F 1/00* (2006.01)
*G02F 2/00* (2006.01)
*H04B 17/00* (2006.01)

(52) U.S. Cl.
USPC ........................ 398/5; 398/3; 398/19; 398/12

(58) Field of Classification Search
USPC ................ 398/1–9, 12, 17, 19; 370/216–228
See application file for complete search history.

(56) References Cited

U.S. PATENT DOCUMENTS

| | | | | |
|---|---|---|---|---|
| 5,307,353 A * | 4/1994 | Yamashita et al. | ............. | 714/4.1 |
| 5,870,382 A * | 2/1999 | Tounai et al. | ............. | 370/220 |
| 6,023,359 A * | 2/2000 | Asahi | ............. | 398/5 |
| 6,041,037 A * | 3/2000 | Nishio et al. | ............. | 370/228 |
| 6,130,764 A * | 10/2000 | Taniguchi | ............. | 398/1 |
| 6,414,771 B2 * | 7/2002 | Al-Salameh et al. | ............. | 398/48 |
| 6,434,288 B1 * | 8/2002 | Uemura et al. | ............. | 385/16 |
| 6,477,288 B1 * | 11/2002 | Sato | ............. | 385/16 |
| 6,504,963 B1 * | 1/2003 | Fang et al. | ............. | 385/16 |
| 6,614,754 B1 * | 9/2003 | Usuba et al. | ............. | 370/222 |
| 6,643,041 B1 * | 11/2003 | Ikeda et al. | ............. | 398/79 |
| 7,058,298 B2 * | 6/2006 | Koyano et al. | ............. | 398/17 |
| 7,158,478 B1 * | 1/2007 | Mazzurco et al. | ............. | 370/222 |
| 7,158,720 B1 * | 1/2007 | Mazzurco et al. | ............. | 398/4 |
| 7,248,561 B2 * | 7/2007 | Ishibashi et al. | ............. | 370/228 |
| 7,349,962 B2 * | 3/2008 | Miller et al. | ............. | 709/224 |
| 7,746,767 B2 * | 6/2010 | Allasia et al. | ............. | 370/216 |
| 7,751,705 B2 * | 7/2010 | Chan et al. | ............. | 398/5 |
| 7,756,019 B2 * | 7/2010 | Zhai | ............. | 370/228 |
| 7,974,185 B2 * | 7/2011 | Manral et al. | ............. | 370/223 |
| 8,040,796 B2 * | 10/2011 | Beauford | ............. | 370/225 |
| 2002/0105693 A1 * | 8/2002 | Kobayashi et al. | ............. | 359/124 |
| 2003/0043427 A1 * | 3/2003 | Robidas et al. | ............. | 359/110 |
| 2009/0129772 A1 * | 5/2009 | Trudel et al. | ............. | 398/8 |
| 2011/0010589 A1 * | 1/2011 | Pitchforth, Jr. | ............. | 714/48 |

* cited by examiner

*Primary Examiner* — Ken Vanderpuye
*Assistant Examiner* — Dibson Sanchez
(74) *Attorney, Agent, or Firm* — Staas & Halsey LLP

(57) ABSTRACT

A transmission apparatus includes a processor configured to recognize a number of working failures and a number of protection failures on a network for transmission of wavelength-multiplexed signal light, the number of working failures being the number of failures in signal light in wavelengths at a working entity and the number of protection failures being the number of failures in signal light in wavelengths at a protection entity, configured to perform path switching for each group of signal light in wavelengths that are different from each other and configured to select, when multiple failures occur, restoration processing, on a basis of the number of working failures and the number of protection failures.

7 Claims, 44 Drawing Sheets

FIG. 11

APS MESSAGE

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| BRIDGE REQUEST CODE | | | | DEST ID | | | | SRC ID | | | | L/S | | | | STATUS | | | | NUMBER OF WORKING FAILURES | | | | | | | | NUMBER OF PROTECTION FAILURES | | | |

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0011 (C) | | | | 0010 (B) | | | | 1 (L) | 010 (br&sw) | | | 00001001 (9) | | | | | | | | 00000001 (1) | | | | | | | |

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0011 (C) | | | | 0010 (B) | | | | 0 (S) | 010 (br&sw) | | | 00001001 (9) | | | | | | | | 00000001 (1) | | | | | | | |

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0010 (B) | | | | 0011 (C) | | | | 1 (L) | 010 (br&sw) | | | 00001001 (9) | | | | | | | | 00000001 (1) | | | | | | | |

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0010 (B) | | | | 0011 (C) | | | | 0 (S) | 010 (br&sw) | | | 00001001 (9) | | | | | | | | 00000001 (1) | | | | | | | |

FIG. 18A d15

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0101 (E) | | | | 0110 (F) | | | | 1 (L) | 010 (br&sw) | | | 000000010 (2) | | | | | | | | 00001010 (10) | | | | | | | |

FIG. 18B d16

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0101 (E) | | | | 0110 (F) | | | | 0 (S) | 010 (br&sw) | | | 000000010 (2) | | | | | | | | 00001010 (10) | | | | | | | |

FIG. 18C d17

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0110 (F) | | | | 0101 (E) | | | | 1 (L) | 010 (br&sw) | | | 000000010 (2) | | | | | | | | 00001010 (10) | | | | | | | |

FIG. 18D d18

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0110 (F) | | | | 0101 (E) | | | | 0 (S) | 010 (br&sw) | | | 000000010 (2) | | | | | | | | 00001010 (10) | | | | | | | |

FIG. 22A d21

| APS1 | | APS2 | | | APS3 | APS4 |
|---|---|---|---|---|---|---|
| 1\|2\|3\|4 | 5\|6\|7\|8 | 1\|2\|3\|4 | 5 | 6\|7\|8 | 1\|2\|3\|4\|5\|6\|7\|8 | 1\|2\|3\|4\|5\|6\|7\|8 |
| 1011 (SF-R) | 0011 (C) | 0010 (B) | 1 (L) | 010 (br&sw) | 000001001 (9) | 00000100 (4) |

FIG. 22B d22

| APS1 | | APS2 | | | APS3 | APS4 |
|---|---|---|---|---|---|---|
| 1\|2\|3\|4 | 5\|6\|7\|8 | 1\|2\|3\|4 | 5 | 6\|7\|8 | 1\|2\|3\|4\|5\|6\|7\|8 | 1\|2\|3\|4\|5\|6\|7\|8 |
| 1011 (SF-R) | 0011 (C) | 0010 (B) | 0 (S) | 010 (br&sw) | 000001001 (9) | 00000100 (4) |

FIG. 22C d23

| APS1 | | APS2 | | | APS3 | APS4 |
|---|---|---|---|---|---|---|
| 1\|2\|3\|4 | 5\|6\|7\|8 | 1\|2\|3\|4 | 5 | 6\|7\|8 | 1\|2\|3\|4\|5\|6\|7\|8 | 1\|2\|3\|4\|5\|6\|7\|8 |
| 1011 (SF-R) | 0010 (B) | 0011 (C) | 1 (L) | 010 (br&sw) | 000001001 (9) | 00000100 (4) |

FIG. 22D d24

| APS1 | | APS2 | | | APS3 | APS4 |
|---|---|---|---|---|---|---|
| 1\|2\|3\|4 | 5\|6\|7\|8 | 1\|2\|3\|4 | 5 | 6\|7\|8 | 1\|2\|3\|4\|5\|6\|7\|8 | 1\|2\|3\|4\|5\|6\|7\|8 |
| 1011 (SF-R) | 0010 (B) | 0011 (C) | 0 (S) | 010 (br&sw) | 000001001 (9) | 00000100 (4) |

FIG. 24A d31

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0011 (C) | | | | 0010 (B) | | | | 1 (L) | 000 (idle) | | | 000001001 (9) | | | | | | | | 00000100 (4) | | | | | | | |

FIG. 24B d32

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0011 (C) | | | | 0010 (B) | | | | 0 (S) | 000 (idle) | | | 000001001 (9) | | | | | | | | 00000100 (4) | | | | | | | |

FIG. 24C d33

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0010 (B) | | | | 0011 (C) | | | | 1 (L) | 000 (idle) | | | 000001001 (9) | | | | | | | | 00000100 (4) | | | | | | | |

FIG. 24D d34

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0010 (B) | | | | 0011 (C) | | | | 0 (S) | 000 (idle) | | | 000001001 (9) | | | | | | | | 00000100 (4) | | | | | | | |

FIG. 25A d35

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0101 (E) | | | | 0110 (F) | | | | 1 (L) | 000 (idle) | | | 000000010 (2) | | | | | | | | 00001010 (10) | | | | | | | |

FIG. 25B d36

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0101 (E) | | | | 0110 (F) | | | | 0 (S) | 000 (idle) | | | 000000010 (2) | | | | | | | | 00001010 (10) | | | | | | | |

FIG. 25C d37

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0110 (F) | | | | 0101 (E) | | | | 1 (L) | 000 (idle) | | | 000000010 (2) | | | | | | | | 00001010 (10) | | | | | | | |

FIG. 25D d38

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0110 (F) | | | | 0101 (E) | | | | 0 (S) | 000 (idle) | | | 000000010 (2) | | | | | | | | 00001010 (10) | | | | | | | |

FIG. 29A d41

| APS1 | APS2 | APS3 | APS4 | | | |
|---|---|---|---|---|---|---|
| 1 2 3 4 5 6 7 8 | 1 2 3 4 | 5 6 7 8 | 1 2 3 4 5 6 7 8 | | 1 2 3 4 5 6 7 8 | |
| 1011 (SF-R) | 0101 (E) | 0110 (F) | 1 (L) | 000 (idle) | 000000010 (2) | 00001000 (8) |

FIG. 29B d42

| APS1 | APS2 | APS3 | APS4 | | | |
|---|---|---|---|---|---|---|
| 1 2 3 4 5 6 7 8 | 1 2 3 4 | 5 6 7 8 | 1 2 3 4 5 6 7 8 | | 1 2 3 4 5 6 7 8 | |
| 1011 (SF-R) | 0101 (E) | 0110 (F) | 0 (S) | 000 (idle) | 000000010 (2) | 00001000 (8) |

FIG. 29C d43

| APS1 | APS2 | APS3 | APS4 | | | |
|---|---|---|---|---|---|---|
| 1 2 3 4 5 6 7 8 | 1 2 3 4 | 5 6 7 8 | 1 2 3 4 5 6 7 8 | | 1 2 3 4 5 6 7 8 | |
| 1011 (SF-R) | 0110 (F) | 0101 (E) | 1 (L) | 000 (idle) | 000000010 (2) | 00001000 (8) |

FIG. 29D d44

| APS1 | APS2 | APS3 | APS4 | | | |
|---|---|---|---|---|---|---|
| 1 2 3 4 5 6 7 8 | 1 2 3 4 | 5 6 7 8 | 1 2 3 4 5 6 7 8 | | 1 2 3 4 5 6 7 8 | |
| 1011 (SF-R) | 0110 (F) | 0101 (E) | 0 (S) | 000 (idle) | 000000010 (2) | 00001000 (8) |

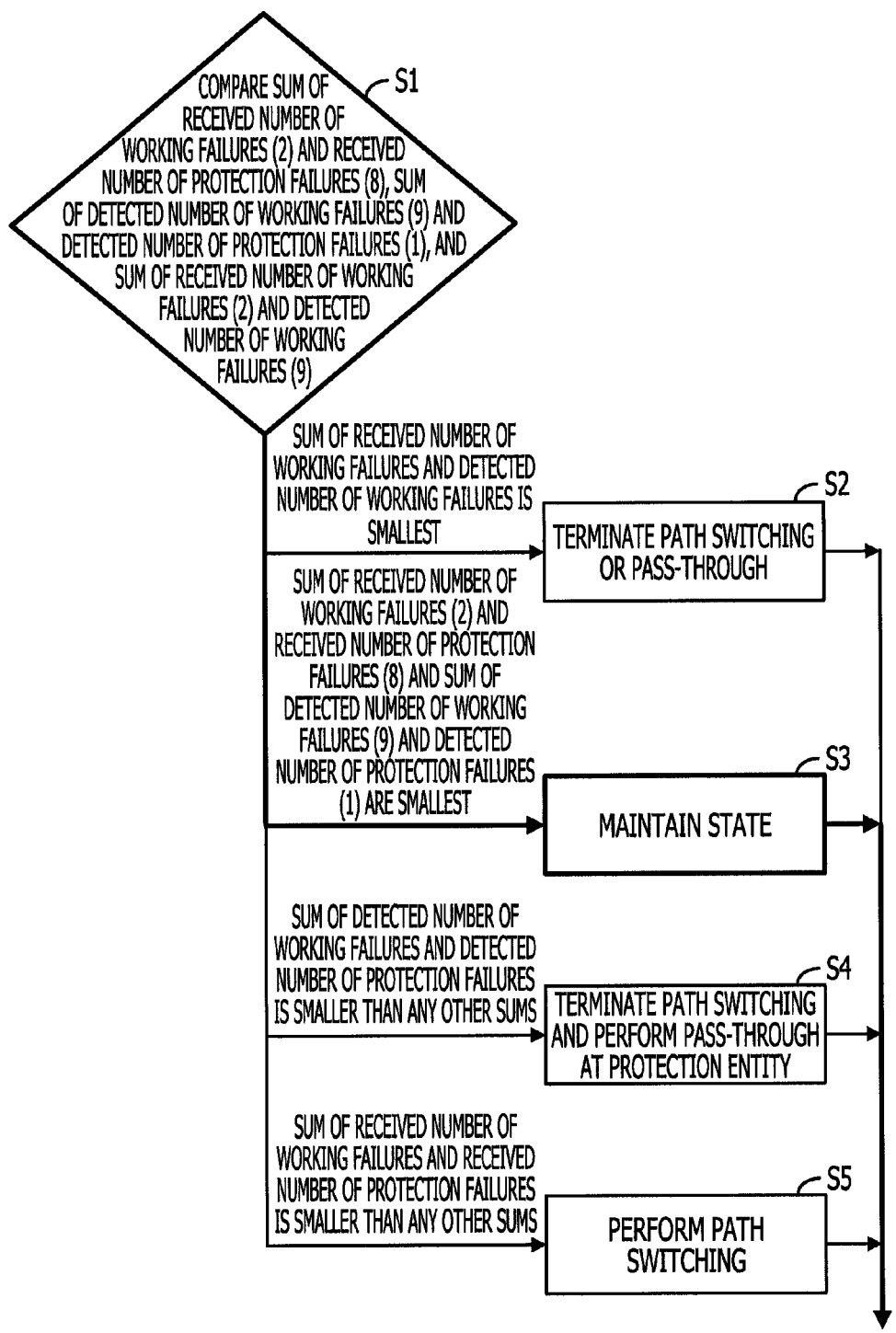

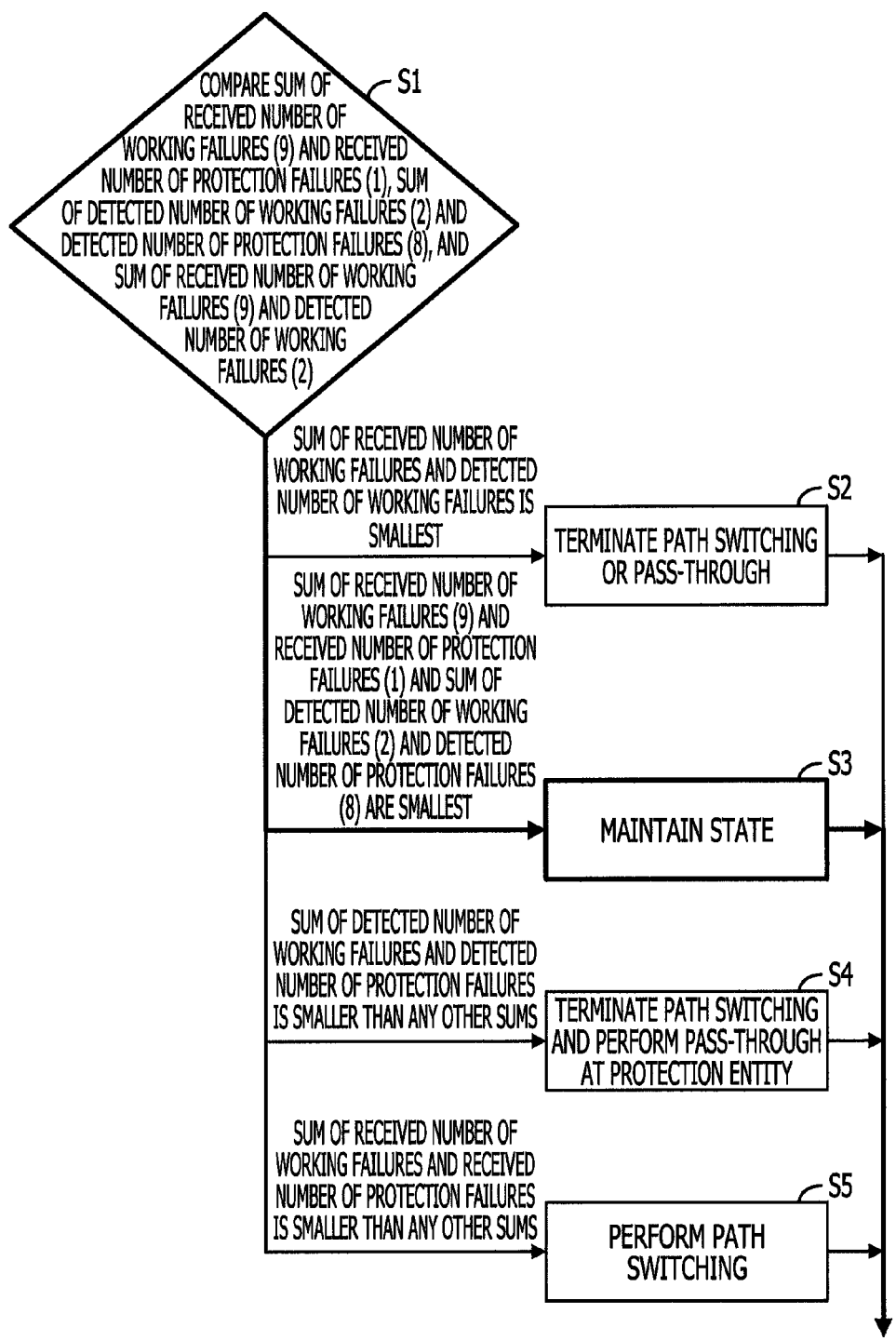

FIG. 32

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| BREDGE REQUEST CODE | | | | DEST ID | | | | SRC ID | | | | L/S | STATUS | | | NUMBER OF FAILURES | | | | | | | | RESERVED | | | | | | | |

FIG. 35A d51

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0011 (C) | | | | 0010 (B) | | | | 1 (L) | 010 (br&sw) | | | 000001010 (10) | | | | | | | | RESERVED | | | | | | | |

FIG. 35B d52

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0011 (C) | | | | 0010 (B) | | | | 0 (S) | 010 (br&sw) | | | 000001010 (10) | | | | | | | | RESERVED | | | | | | | |

FIG. 35C d53

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0010 (B) | | | | 0011 (C) | | | | 1 (L) | 010 (br&sw) | | | 000001010 (10) | | | | | | | | RESERVED | | | | | | | |

FIG. 35D d54

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0010 (B) | | | | 0011 (C) | | | | 0 (S) | 010 (br&sw) | | | 000001010 (10) | | | | | | | | RESERVED | | | | | | | |

FIG. 40A d71

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0011 (C) | | | | 0010 (B) | | | | 1 (L) | 000 (idle) | | | 000001010 (10) | | | | | | | | RESERVED | | | | | | | |

FIG. 40B d72

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0011 (C) | | | | 0010 (B) | | | | 0 (S) | 000 (idle) | | | 000001010 (10) | | | | | | | | RESERVED | | | | | | | |

FIG. 40C d73

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0010 (B) | | | | 0011 (C) | | | | 1 (L) | 000 (idle) | | | 000001010 (10) | | | | | | | | RESERVED | | | | | | | |

FIG. 40D d74

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0010 (B) | | | | 0011 (C) | | | | 0 (S) | 000 (idle) | | | 000001010 (10) | | | | | | | | RESERVED | | | | | | | |

FIG. 41A d75

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0101 (E) | | | | 0110 (F) | | | | 1 (L) | 010 (br&sw) | | | 000001100 (12) | | | | | | | | RESERVED | | | | | | | |

FIG. 41B d76

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0101 (E) | | | | 0110 (F) | | | | 0 (S) | 010 (br&sw) | | | 000001100 (12) | | | | | | | | RESERVED | | | | | | | |

FIG. 41C d77

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0110 (F) | | | | 0101 (E) | | | | 1 (L) | 010 (br&sw) | | | 000001100 (12) | | | | | | | | RESERVED | | | | | | | |

FIG. 41D d78

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1011 (SF-R) | | | | 0110 (F) | | | | 0101 (E) | | | | 0 (S) | 010 (br&sw) | | | 000001100 (12) | | | | | | | | RESERVED | | | | | | | |

TRANSMISSION APPARATUS AND NETWORK PROTECTION METHOD

CROSS-REFERENCE TO RELATED APPLICATION(S)

This application is based upon and claims the benefit of priority of the prior Japanese Patent Application No. 2011-28069, filed on Feb. 14, 2011, the entire contents of which are incorporated herein by reference.

FIELD

The embodiment discussed herein is related to a transmission apparatus and a network protection method which restore a communication during a failure.

BACKGROUND

In conjunction with increases in transmission speeds and volumes in recent years, optical network systems that utilize an OTN (optical transport network: ITU-T G.709) to perform wavelength division multiplexing (WDM) have been put to practical use.

The OTN is a technology in which client signals based on SONET/SDH (Synchronous Optical Network/Synchronous Digital Hierarchy), Ethernet®, or the like are used and frames having a hierarchical structure are generated to perform data transmission suitable for WDM.

There are also demands for a protection scheme for achieving high-speed restoration of a communication during a failure. In known ring networks for transmission of SONET/SDH signals or the like that are not wavelength-multiplexed, protection schemes, such as BLSR (Bidirectional Line Switched Ring: Telcordia GR-1230-CORE) and MS SPRING (Multiplex Section Shared Protection Ring: ITU-T G.841, have been employed.

In those protection schemes, a path is looped back at nodes at two opposite ends of a failed link to avoid the failure. If such a protection scheme is simply applied to a WDM ring network, multiple protection rings configured for respective wavelengths operate interpedently. This results in an increase in the amount of processing load, thus making it difficult to realize high-speed restoration.

Thus, the ITU-T G.808.1 group protection scheme may be applied to an OTN WDM ring network. In this approach, when a failure occurs in signal light in a group of signal light in multiple wavelengths, paths for the signal light in all of the wavelengths in the group are switched at once to thereby realize high-speed restoration.

As related art, Japanese Laid-open Patent Publication No. 2001-156821 discloses a technology for a wavelength-multiplexed ring network. In this technology, control-information analysis at an intermediate node along a communication route is omitted to thereby simplify failure restoration processing. Japanese Laid-open Patent Publication No. 2002-77049 discloses a technology for switching, during redundant switching, routes for optical signals at a time for each unit of wavelength-multiplexed light.

SUMMARY

According to an aspect of the invention, a transmission apparatus includes a processor configured to recognize a number of working failures and a number of protection failures on a network for transmission of wavelength-multiplexed signal light, the number of working failures being the number of failures in signal light in wavelengths at a working entity and the number of protection failures being the number of failures in signal light in wavelengths at a protection entity, configured to perform path switching for each group of signal light in wavelengths that are different from each other and configured to select, when multiple failures occur, restoration processing, on a basis of the number of working failures and the number of protection failures.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 illustrates the format of APS data;
FIGS. 15A to 15D illustrate values of APS data;
FIGS. 18A to 18D illustrate values of APS data;
FIGS. 22A to 22D illustrate values of APS data;
FIGS. 24A to 24D illustrate values of APS data;
FIGS. 25A to 25D illustrate values of APS data;
FIGS. 29A to 29D illustrate values of APS data;
FIG. 30 is a flowchart illustrating restoration control;
FIG. 31 is a flowchart illustrating restoration control;
FIG. 32 illustrates the format of APS data;
FIGS. 35A to 35D illustrate values of APS data.

FIGS. 40A to 40D illustrate values of APS data;
FIGS. 41A to 41D illustrate values of APS data.

DESCRIPTION OF EMBODIMENT

In a group protection scheme as described above, when multiple portions in a ring network have failures in signal light in some wavelengths in a group, path switching occurs at the individual failed portions. Consequently, a large number of paths including portions that have been functioning properly may be disconnected, thus making it difficult to perform high-quality path restoration.

Thus, in the group protection scheme of the related art, since a large number of paths including the normal paths may be disconnected, there is a problem in that the quality and reliability of transmission in the network decline.

The present technology has been made in view of the foregoing situation, and an object of the present technology is to provide a transmission apparatus that is aimed to improve the quality and reliability of transmission.

Another object of the present technology is to provide a network protection method that is aimed to improve the quality and reliability of transmission.

Figure 1:
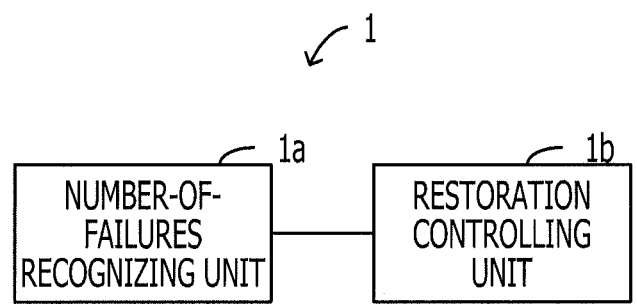
FIG. 1 illustrates an example of the configuration of a transmission apparatus.

An embodiment of the present technology will be described below with reference to the accompanying drawings. FIG. 1 illustrates an example of the configuration of a transmission apparatus. The transmission apparatus 1 includes a number-of-failures recognizing unit 1a and a restoration controlling unit 1b. The transmission apparatus 1 is placed at, for example, each of nodes in a ring-based network for WDM transmission.

The number-of-failures recognizing unit is recognizes the number of "working" failures and the number of "protection" failures on the network for transmission of wavelength-multiplexed signal light, the number of working failures being the number of failures in signal light in wavelengths at a working entity and the "number of protection failures" being the number of failures in signal light in wavelengths at a protection entity.

The restoration controlling unit 1b performs path switching for each group of signal light in wavelengths that are different from each other. That is, when path switching is to be performed during failure of signal light in the group, the restoration controlling unit 1b switches paths for the signal light in all of the wavelengths in the group at once. The term "path switching" as used herein refers to switching a working path to a protection path at a node to perform loop-back transmission of signal light through the protection path in a direction opposite to the transmission direction of the working path.

When multiple failures occur (i.e., multiple portions on the network have failures in signal light in some wavelengths in the group), restoration processing by which the number of paths restored is the largest is selected and executed based on the number of working failures and the number of protection failures.

Figure 2:
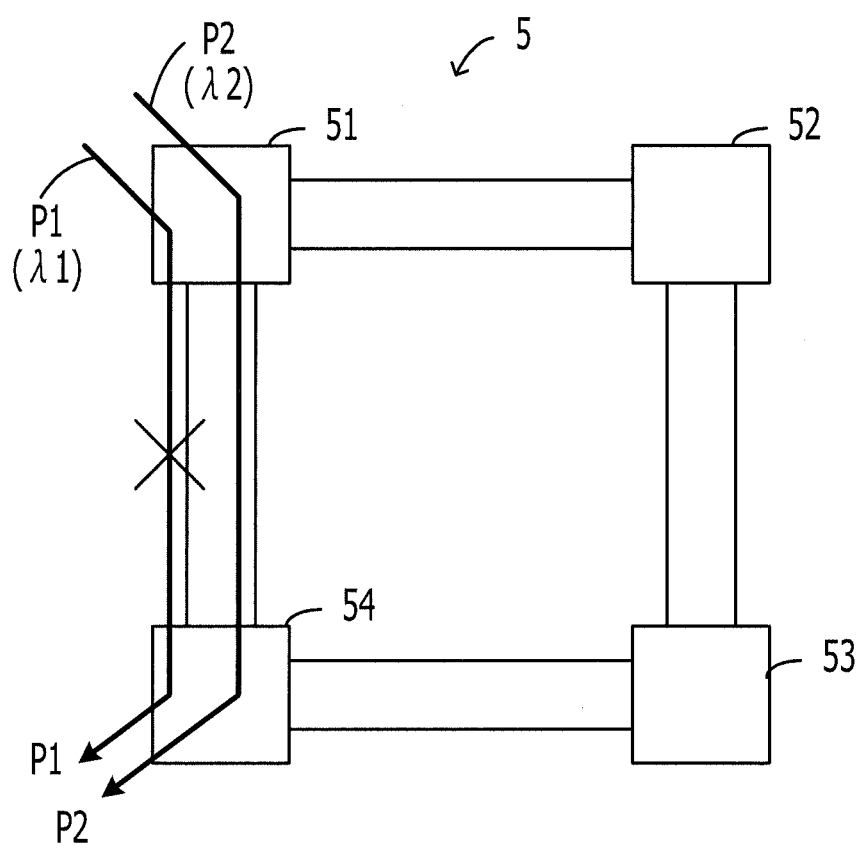
FIG. 2 illustrates a failure in a ring network.

Next, a description will be given of failure avoidance based on a typical group protection scheme. FIG. 2 illustrates a failure in a ring network. A ring network 5 for WDM transmission includes nodes 51 to 54, which are interconnected in a ring topology through optical fibers. It is assumed that one group is constituted by different wavelengths λ1 and λ2.

It is further assumed that the node 51 is a source node and the node 54 is a destination node. A path P1 for the wavelength λ1 is established between the paths 51 and 54 and data input to the path P1 at the node 51 is transmitted to the node 54 through the path P1 and is output from the node 54 through the path P1.

A path P2 for the wavelength λ2 is established between the paths 51 and 54 and data input to the path P2 at the node 51 is transmitted to the node 54 through the path P2 and is output from the node 54 through the path P2. It is assumed that, in such a communication state, a failure occurs in the path P1 between the nodes 51 and 54.

Figure 3:
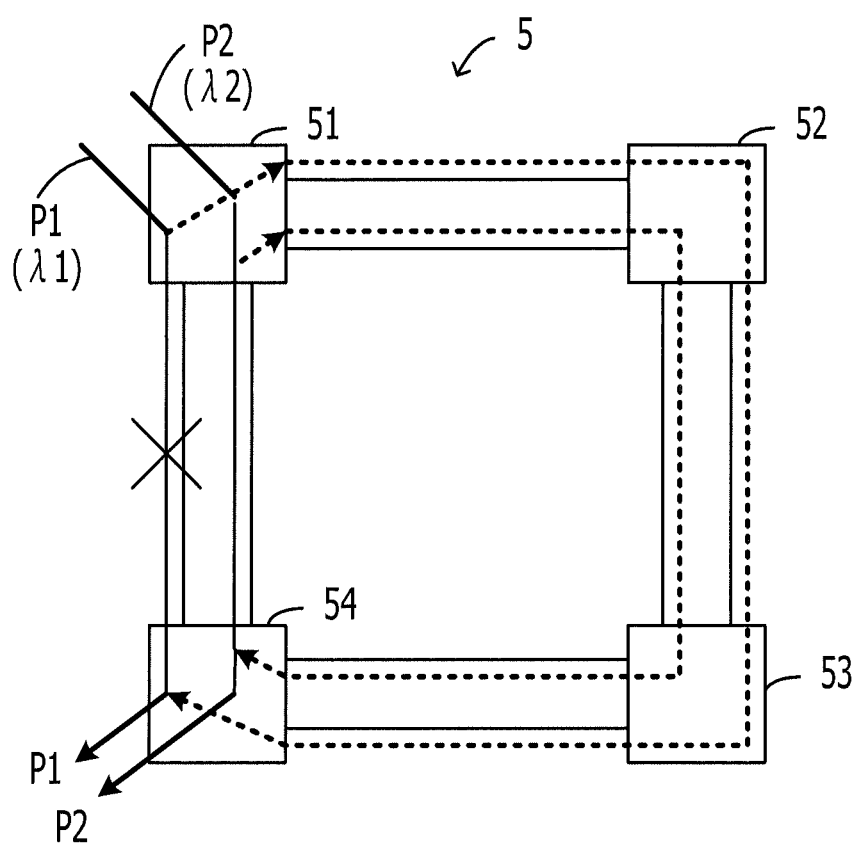
FIG. 3 illustrates failure avoidance.

FIG. 3 illustrates failure avoidance. In the description below, protection paths are denoted by dotted lines. When a failure occurs in the path P1 between the nodes 51 and 54, the node 51 performs path switching on the path P1 to make a loop back through the protection path in the opposite direction to thereby establish a detour path for the wavelength λ1 via the nodes 52 and 53. The detour path is connected to the path P1 at the node 54.

In the group protection scheme, when a failure occurs in signal light in any of the wavelengths in the same group, paths for signal light in all of the wavelengths in the group are switched at once. Thus, since the wavelength λ1 and the wavelength λ2 belong to the same group in this case, the path P2 for the wavelength λ2 is also switched even when the path P2 does not fail.

That is, when a failure occurs in the path P1 between the nodes 51 and 54, the node 51 performs path switching on the path P2 to make a loop back through the protection path in the opposite direction to thereby establish a detour path for the wavelength λ2 via the nodes 52 and 53. The detour path is connected to the path P2 at the node 54.

When a single failure occurs as illustrated FIG. 3, data input from the path P1 at the node 51 is output from the path P1 at the node 54 through the detour path and data input from the path P2 at the node 51 is output from the path P2 at the node 54 through the detour path, so that the communication is restored.

Figure 4:
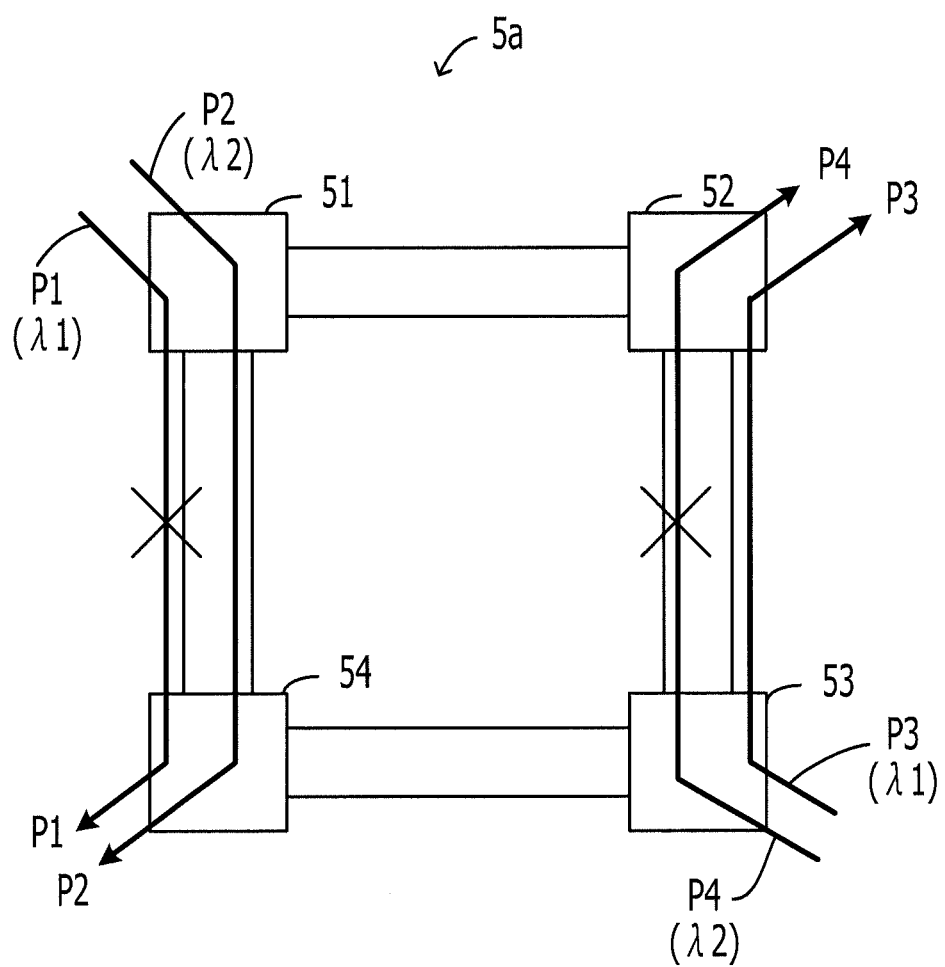
FIG. 4 illustrates a failure in a ring network.

FIG. 4 illustrates a failure on a ring network. A ring network 5a has a network topology that is similar to that of the ring network 5 in FIG. 2 in that the wavelengths λ1 and λ2 belong to the same group. In the ring network 5a, however, paths P3 and P4 are further established in addition to the paths P1 and P2. The paths P3 and P4 will now be described.

It is assumed that the node 53 is a source node and the node 52 is a destination node. The path P3 for the wavelength λ1 is established between the paths 52 and 53 and data input to the path P3 at the node 53 is transmitted to the node 52 through the path P3 and is output from the node 52 through the path P3.

The path P4 for the wavelength λ2 is established between the paths 52 and 53 and data input to the path P4 at the node 53 is transmitted to the node 52 through the path P4 and is output from the node 52 through the path P4. It is assumed that, in this case, a failure occurs in the path P4 between the nodes 52 and 53 in addition to the failure in the path P1 between the nodes 51 and 54 (i.e., multiple failures occur).

Figure 5:
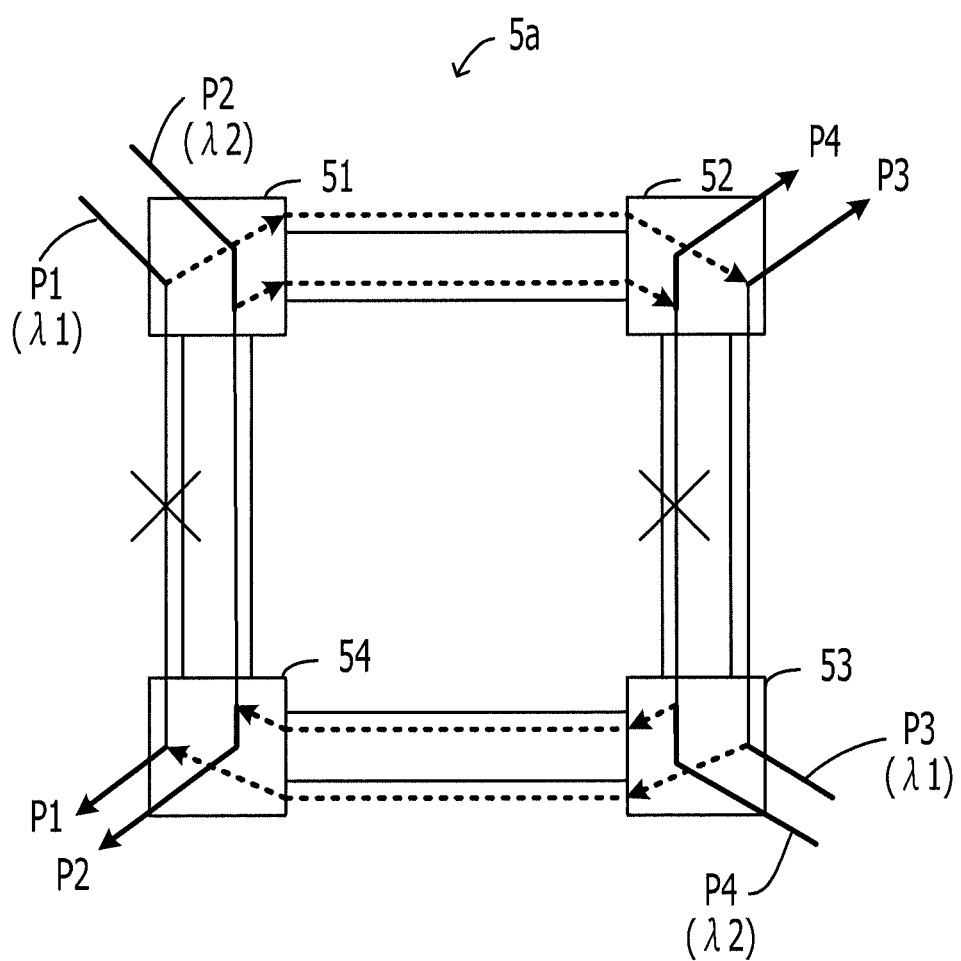
FIG. 5 illustrates failure avoidance.

FIG. 5 illustrates failure avoidance. Since the path P1 between the nodes 51 and 54 has failed, the node 51 performs path-switching loop-back processing on both of the path P1 for the wavelength λ1 and the path P2 for the wavelength λ2 that is in the same group as the wavelength λ1, as illustrated in FIG. 3.

Since the path P4 between the nodes 52 and 53 has failed, the node 53 also performs path-switching loop-back processing on both of the path P4 for the wavelength λ2 and the path P3 for the wavelength λ1 that is in the same group as the wavelength λ2.

In this case, although the wavelength λ1 signal light input to the path P1 at the node 51 is supposed to be looped back and transmitted to the node 54 via the nodes 52 and 53, the signal light is not transmitted to the node 53 since the loop-back processing has also been performed at the node 53. Thus, the signal light is connected to the wavelength λ1 path P3 at the intermediate node 52 and is output from the path P3 at the node 52. The wavelength λ2 signal light input to the path P2 at the node 51 is also connected to the wavelength λ2 path P4 at the node 52.

In addition, although the wavelength λ2 signal light input to the path P4 at the node 53 is supposed to be looped back and transmitted to the node 52 via the nodes 54 and 51, the signal light is not transmitted to the node 51 since the loop-back processing has also been performed at the node 51. Thus, the signal light is connected to the wavelength λ2 path P2 at the intermediate node 54 and is output from the path P2 at the node 54. The wavelength λ1 signal light input to the path P3 at the node 53 is also connected to the wavelength λ1 path P1 at the node 54.

Figure 6:
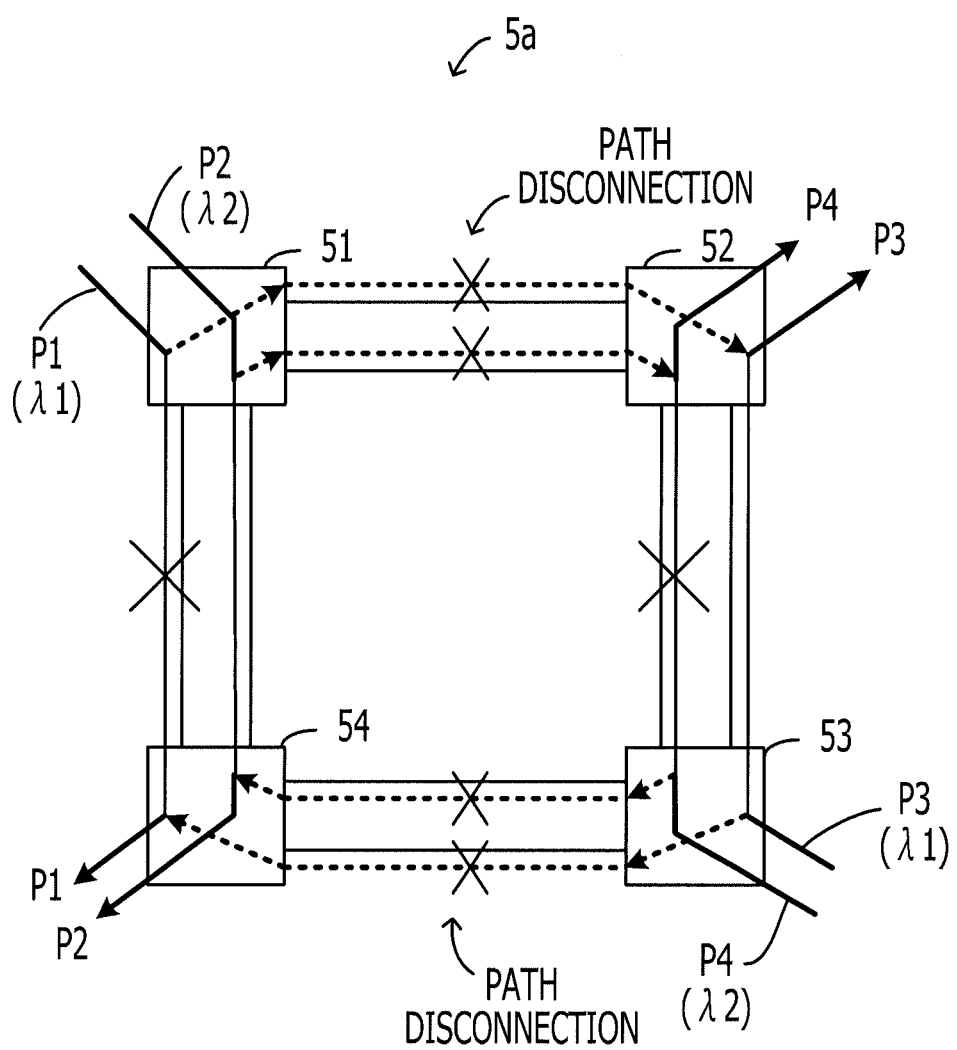
FIG. 6 illustrates path disconnection.

FIG. 6 illustrates path disconnection. When multiple failures as illustrated in FIG. 5 occur, the path P1 looped back at the node 51 is connected to the path P3 at the node 52 and the path P2 looped back at the node 51 is connected to the path P4 at the node 52. That is, an erroneous path connection occurs.

Similarly, the path P3 looped back at the node 53 is connected to the path P1 at the node 54, and the path P4 looped back at the node 53 is connected to the path P2 at the node 54. That is, an erroneous path connection occurs.

As described above, when restoration processing based on the group protection scheme is performed during multiple failures, an erroneous path connection occurs. Hence, in the related, a function for processing called "squelching" is provided. In the squelching, when such an erroneous path connection occurs, a warning signal called an "AIS (alarm indication signal)" flows between the nodes to thereby nullify the data flowing through the current path. However, when the squelching is started, all paths are eventually disconnected and the communication on the network is disabled.

Thus, in the related, art, when multiple failures occur, there is a possibility that all paths including normal paths are disconnected. The present technology, therefore, has been conceived in view of such a problem and provides a transmission apparatus and a network protection method which save a larger number of paths to realize high-quality communication restoration even when multiple failures occur and which also achieve improvements in the quality and reliability of transmission.

Figure 7:
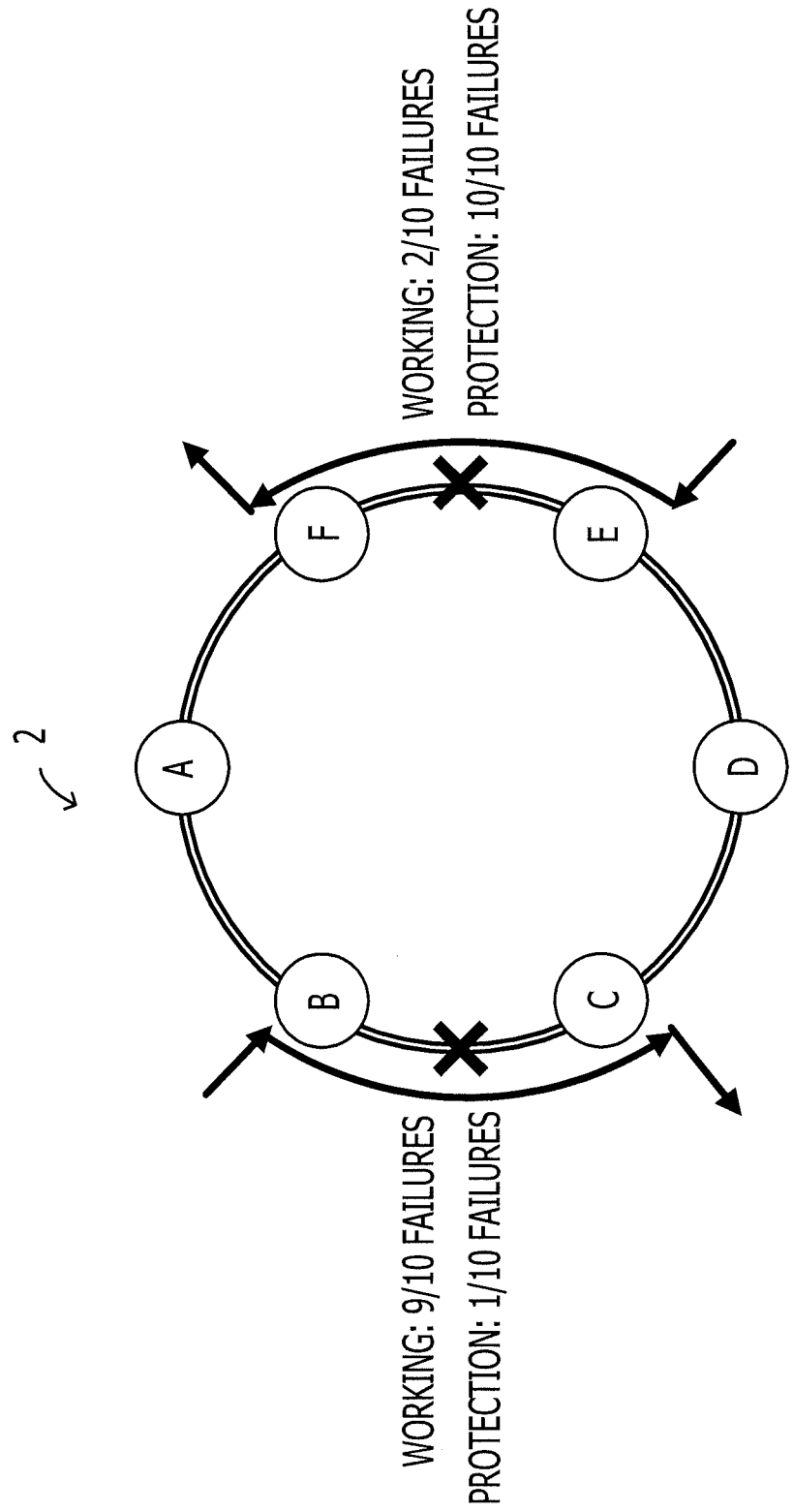
FIG. 7 illustrates a failure in a ring network.

A concept of restoration control performed by the transmission apparatus 1 will be described next. FIG. 7 illustrates a failure in a ring network. A ring network 2 includes nodes A to F, which are interconnected in a ring topology through optical fibers. The transmission apparatus 1 is arranged at each of the nodes A to F.

The ring network 2 has a redundant architecture, i.e., an architecture including a working entity and a protection entity, each of which performs WDM transmission in ten wavelengths that are different from each other. It is assumed that ten waveforms at the working entity and ten protection waveforms at the protection entity constitute one group.

It is also assumed that the node B is a source node, the node C is a destination node of the node B, the node E is a source node, the node F is a destination node of the node E, and paths are established for the respective wavelengths. It is also assumed that, between the nodes B and C, failures occur in nine of the ten wavelengths at the working entity and a failure occurs in one of the ten wavelengths at the protection entity.

In addition, it is assumed that, between the nodes E and F, failures occur in two of the ten wavelengths at the working entity and failures occur in all of the ten wavelengths at the protection entity (in FIG. 7, a state in which N of M wavelengths have failures is denoted by "N/M failures").

In this case, failures occur both between the nodes B and C and between the nodes E and F, that is, multiple failures occur. In this case, when the path-switching loop-back transmission is performed at both of the nodes B and C side and the node E and F side, as in the related art, squelching as described above is started and all paths including the normal paths on the network may be disconnected.

Accordingly, rather than performing both path switching at the node B and C side and path switching at the node E and F side, the path switching of one of the sides is selected to perform protection processing so that as many paths as possible can be saved. The protection processing will now be described specifically.

In this case, two failures, i.e., a failure between the nodes B and C and a failure between E and F, occur. Thus, the number of all paths that can be restored by performing only the path switching at the node B and C side and the number of all paths that can be restored by performing only the path switching at the node E and F side are determined, results of the determinations are compared with each other, and the path switching by which a larger number of paths can be restored is selected and executed.

Figure 8:
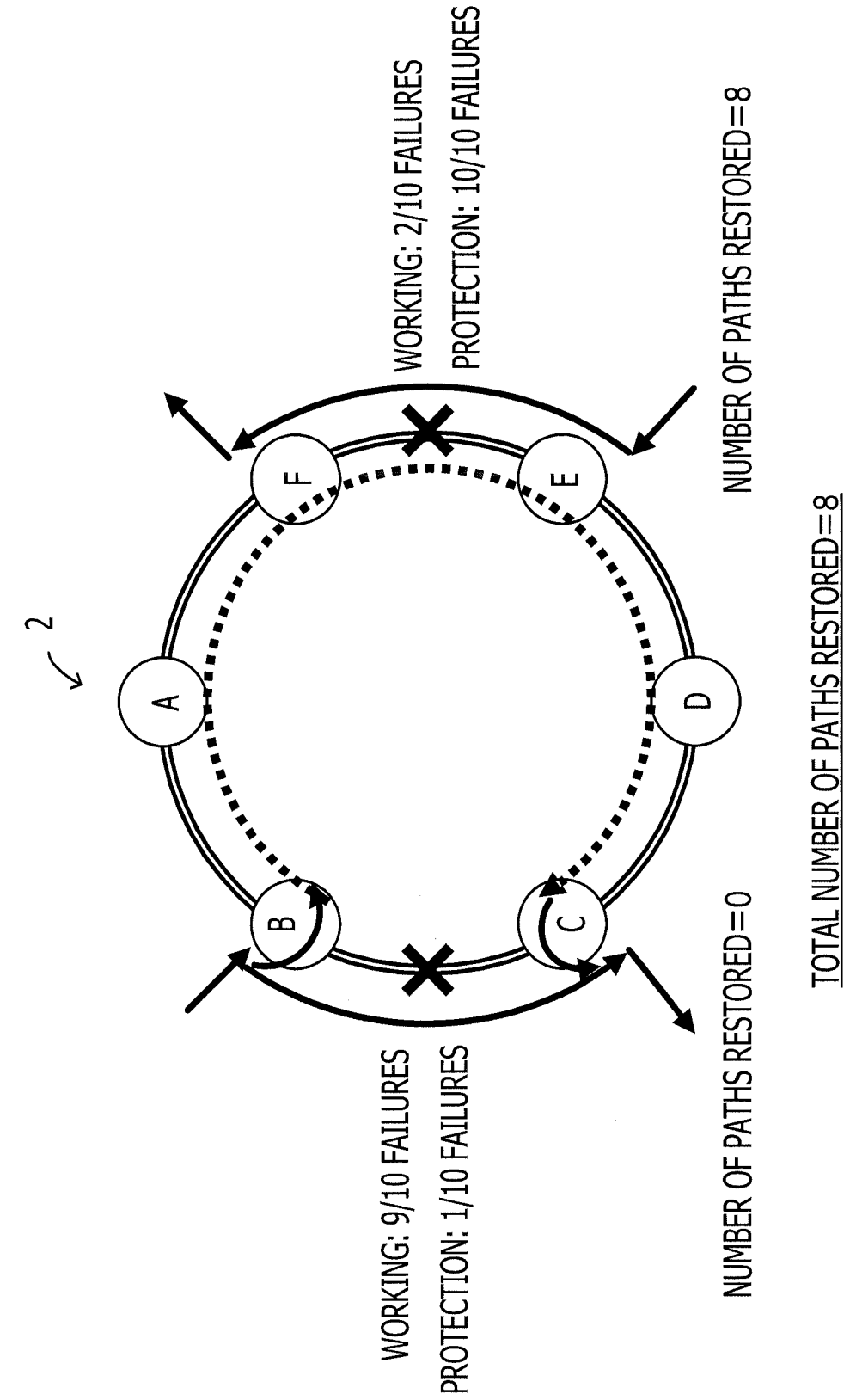
FIG. 8 illustrates path restoration.

FIG. 8 illustrates path restoration. FIG. 8 illustrates path restoration when path switching is performed at only the node B and C side. The node B performs path-switching loop-back processing in an attempt to establish paths for the ten wavelengths toward the node C along the detour protection paths (denoted by a dotted line) that go through the nodes A, F, E, and D.

In this case, however, since failures occur in all of the ten wavelengths at the protection entity between the nodes F and E, no path can be established up to the node C. That is, the number of paths restored out of the paths for the ten wavelengths from the node B to the node C is "0".

On the other hand, although two of the ten wavelengths at the working entity have failures at the node E, working paths for the eight wavelengths are established at the node F since no path switching is performed. That is, the number of paths restored out of the paths for the ten wavelengths from the node E to the node F is "8". Thus, the total number of paths restored in the case of FIG. 8 is 8 (=0+8).

Figure 9:
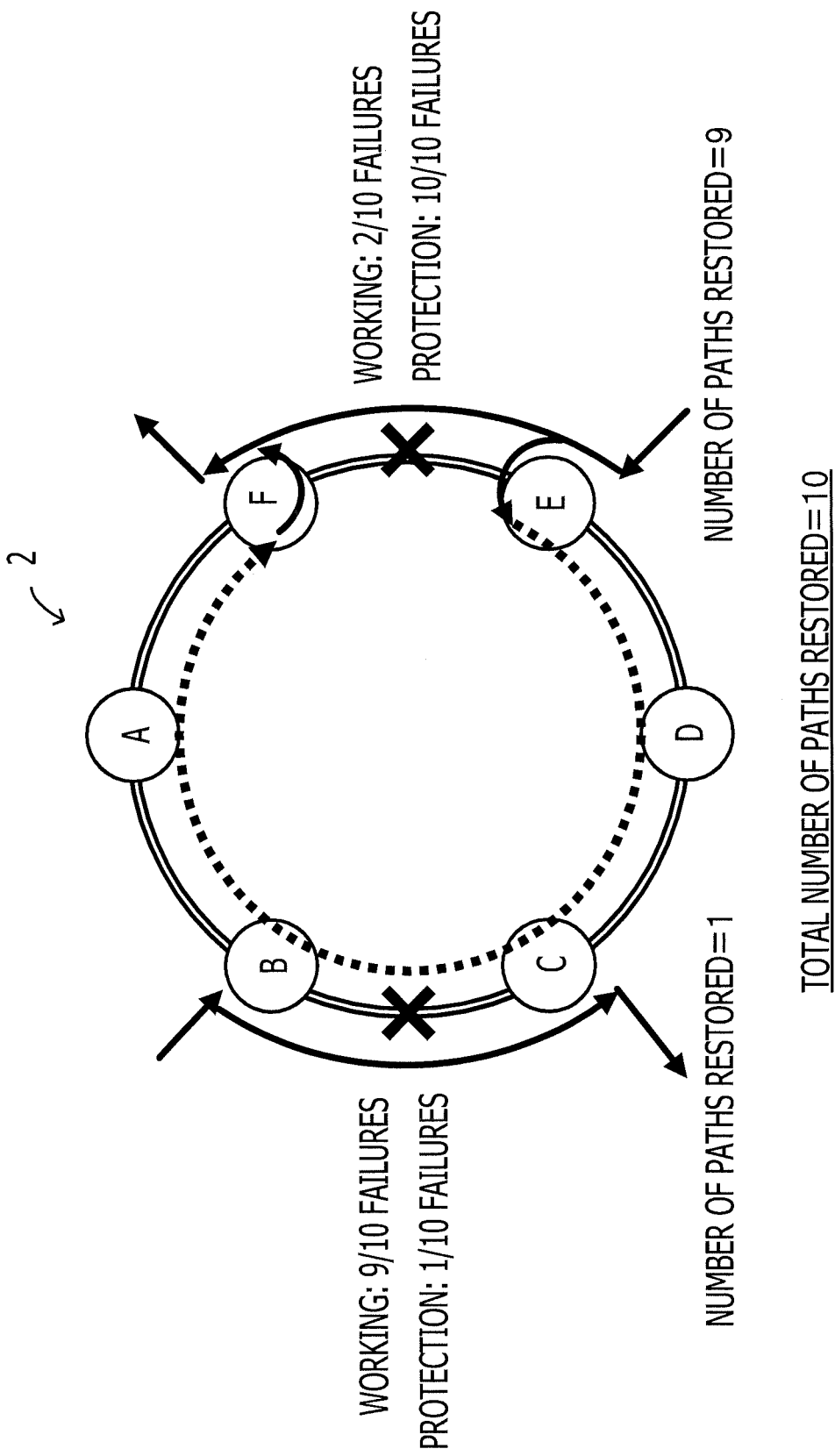
FIG. 9 illustrates path restoration.

FIG. 9 illustrates path restoration. FIG. 9 illustrates path restoration when only path switching at the node E and F side is performed. The node E performs path-switching loop-back processing in an attempt to establish paths for the ten wavelengths toward the node F along the detour protection paths (denoted by a dotted line) that go through the nodes D, C, B, and A.

In this case, however, since one of the ten wavelengths at the protection entity between the nodes B and C has a failure, the paths for the nine wavelengths can be established to the node F. That is, the number of paths restored out of the paths for the ten wavelengths from the node E to the node F is "9".

On the other hand, although nine of the ten wavelengths at the working entity have failures at the node B, the working path for one wavelength is established at the node C since no path switching is performed. That is, the number of paths restored out of the paths for the ten wavelengths from the node B to the node C is "1". Thus, the total number of paths restored in the case of FIG. 9 is 10 (=9+1).

The results of the numbers of paths illustrated in FIGS. 8 and 9 indicate that the total number of paths that can be restored by performing only the path switching on the node E and F side in FIG. 9 is larger than the total number of paths that can be restored by performing only the path switching on the node B and C side in FIG. 8.

Thus, when multiple failures occur, i.e., when a failure between the nodes B and C and a failure between the nodes E and F occur, execution of the path-switching loop-back processing at only the node E and F side makes it possible to restore a total number of ten paths, i.e., a largest number of paths.

In summary, in the group protection scheme of the related art, when multiple failures occur, path switching is performed at both the node B and C side and the node E and F side and thus squelching is started to cause disconnection of all paths.

In contrast, in the configuration according to the present technology, based on the number of all paths that can be restored by performing only the path switching at the node B and C side and the number of all paths that can be restored by performing only the path switching at the node E and F side, the path switching by which a larger number of paths are restored is selected and executed.

With this configuration, even when multiple failures occur in a network employing the group protection scheme, a large number of paths can be saved without disconnection of all paths. Thus, it is possible to improve the quality and reliability of transmission.

Figure 10:
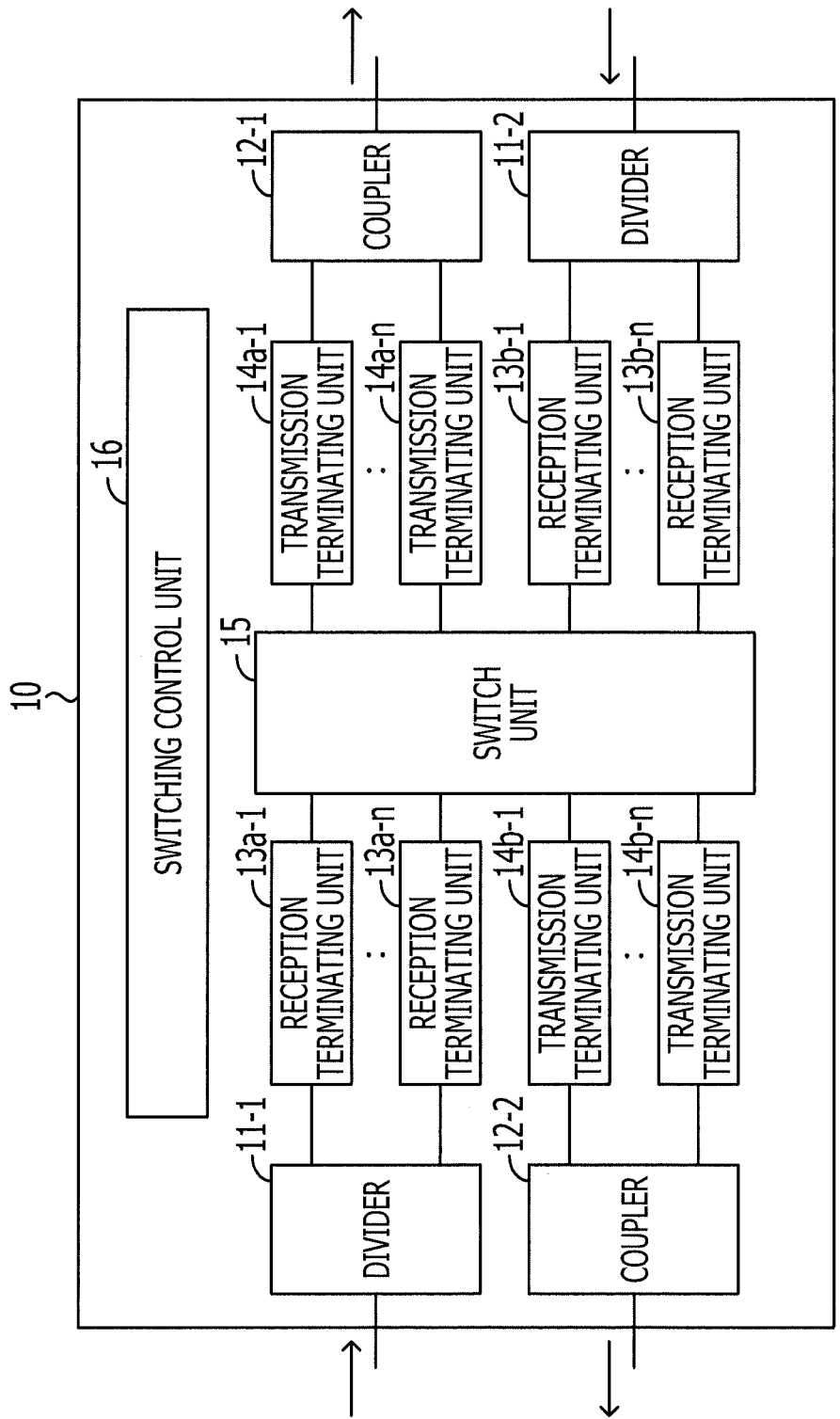
FIG. 10 illustrates an example of the configuration of a node.

An example of the configuration of a node will be described next. FIG. 10 illustrates an example of the configuration of a node. A node 10 includes dividers 11-1 and 11-2, couplers 12-1 and 12-2, reception terminating units 13a-1 to 13a-n and 13b-1 to 13b-n, transmission terminating units 14a-1 to 14a-n and 14b-1 to 14b-n, a switch unit 15, and a switching control unit 16. The switching control unit 16 includes the functions of the number-of-failures recognizing unit 1a and the restoration controlling unit 1b illustrated in FIG. 1.

Each of the dividers 11-1 and 11-2 divides an input wavelength-multiplexed signal into wavelengths. Each of the couplers 12-1 and 12-2 multiplexes wavelengths and outputs a resulting signal. The reception terminating units 13a-1 to 13a-n and 13b-1 to 13b-n perform termination processing on received signals having corresponding wavelengths. Examples of the termination processing involve detection of a failure in a corresponding wavelength and extraction of APS data (automatic protection switching data, which is described below with reference to FIG. 11) for restoration control.

The transmission terminating units 14a-1 to 14a-n and 14b-1 to 14b-n transmit signals including APS data. By performing processing for switching between an input signal and an output signal, the switch unit 15 couples the input signal and the output signal to form a path. During failure, the switch unit 15 performs the path-switching loop-back transmission to thereby perform restoration processing.

The switching control unit 16 recognizes the number of failures by collecting failure information and the APS data from the reception terminating units 13a-1 to 13a-n and 13b-1 to 13b-n. The switching control unit 16 also sends appropriate APS data to the transmission terminating units 14a-1 to 14a-n and 14b-1 to 14b-n to control path switching in cooperation with other nodes to thereby perform recovery from failures. In addition, when the local node is to perform path switching, the switching control unit 16 instructs the switch unit 15 so as to perform path switching.

The format of the APS data will be described next. FIG. 11 illustrates the format of APS data. Each piece of APS data is a message having a total of 4 bytes, i.e., APS1 to APS4 each having 1 byte.

In the APS1 at the first byte, bridge request code is set in the field of bits 1 to 4 and a destination-node ID (Dest ID) is set in the field of bits 5 to 8.

In the APS2 at the second byte, a source-node ID (Src ID) is set in the field of bits 1 to 4 and a value (L&S) indicating "long" or "short" (L represents a long route having a large number of hops and S represents a short route having a small number of hops) is set in the field of bit 5. A status is set in the field of bits 6 to 8.

In the APS3 at the third byte, the number of working failures is set in the field of 1 to 8. The number of working failures refers to the number of failures in wavelengths included in one group and allocated as working wavelengths between the source node and the destination node.

In the APS4 at the fourth byte, the number of protection failures is set in the field of bits 1 to 8. The number of protection failures refers to the number of failures in wavelengths included in the group and allocated as protection wavelengths between the source node and the destination node.

The APS data is transmitted using, for example, an overhead of an HO-ODU (Higher Order—Optical channel Data Unit) flowing over one arbitrary wavelength of the protection wavelengths.

Figure 12:
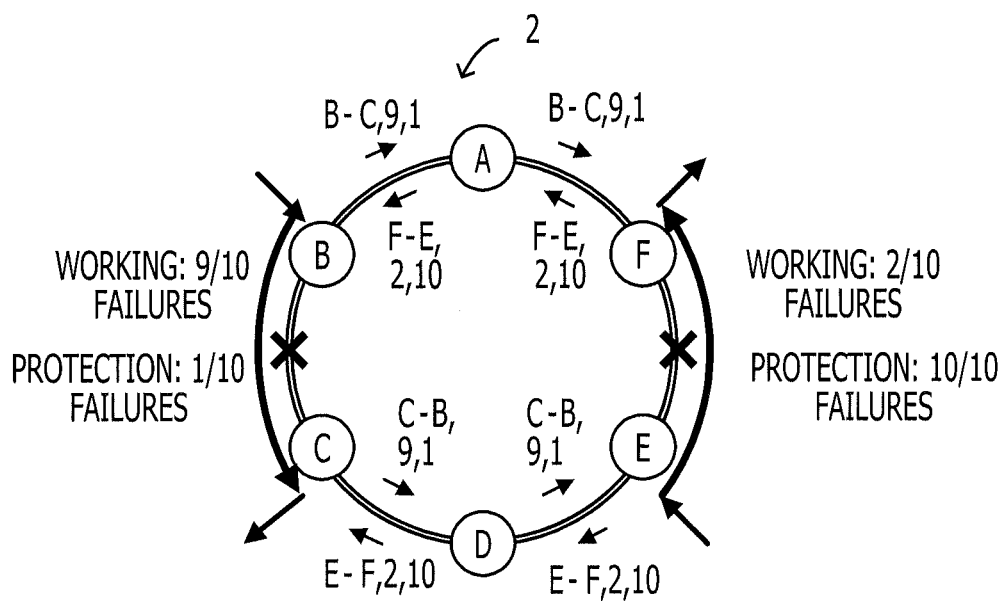
FIG. 12 illustrates an example of transfer of the APS data.

An example of transfer of the APS data will be described next. FIG. 12 illustrates an example of transfer of the APS data. The APS data illustrated in FIG. 12 corresponds to APS data transferred in the ring network 2 illustrated in FIG. 7.

In FIG. 12, for example, "B-C,9,1" represents, as information of the APS data, a source node, a destination node, the number of working failures, and the number of protection failures. Thus, in this case, B represents a source note, C represents a destination node, 9 represents the number of working failures, and 1 represents the number of protection failures. The same notation system also applies to other similar representations in FIG. 12.

In this case, between the nodes B and C, nine of the ten wavelengths at the working entity and one of the ten wavelengths at the protection entity have failures. Thus, upon detecting the failures, the node B transmits the APS data "B-C,9,1" to the node C along a long route that goes through the nodes A, F, E, and D. In this APS data, "9" is set as the number of working failures and "1" is set as the number of protection failures.

When the node A receives the APS data, it transfers the data to the next node F without making changes to the contents of the data. When no other failure occurs, the data is eventually transferred to the node C. Similarly, the node C transfers the APS data "C-B,9,1" to the node B along a long route that goes through the nodes D, E, F, and A.

On the other hand, between the nodes E and F, failures occur in two of the ten wavelengths at the working entity and failures occur in all of the ten wavelengths at the protection entity. Thus, when the node E detects the failures, it sets APS data "E-F,2,10" indicating that the working failures is 2 and the number of protection failures is 10 and transmits the APS data to the node F along a long route that goes through the nodes D, C, B, and A. Similarly, the node F transmits APS data "F-E,2,10" to the node E along a long route that goes through the nodes A, B, C, and D.

Figure 13:
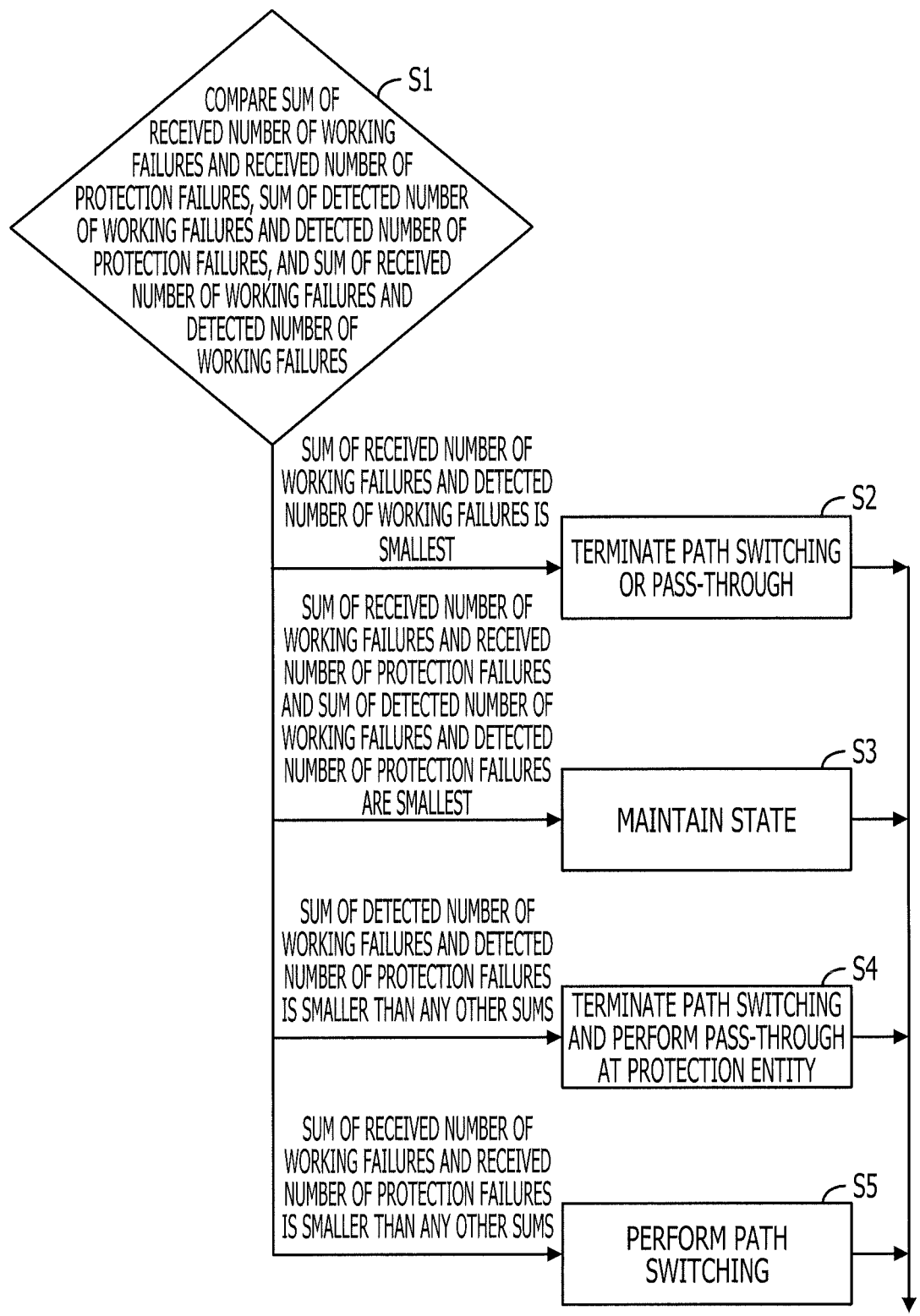
FIG. 13 is a flowchart illustrating restoration control.

Restoration control will now be described with reference to a flowchart. FIG. 13 is a flowchart illustrating restoration control. The "received number of working failures" in FIG. 13 refers to the number of working failures which is contained in the APS data transmitted from another node and received. The "received number of protection failures" in FIG. 13 refers to the number of protection failures which is contained in the APS data transmitted from another node and received.

Also, the "detected number of working failures" refers to the number of failed wavelengths included in the working wavelengths in one group and detected by the local node. Also, the "detected number of protection failures" refers to the number of failed wavelengths included in the protection wavelengths in the group and detected by the local node.

In step S1, the switching control unit 16 determines a sum of the received number of working failures and the received number of protection failures, a sum of the detected number of working failures and the detected number of protection failures, and a sum of the received number of working failures and the detected number of working failures and compares results of the determinations with each other.

When the sum of the received number of working failures and the detected number of working failures is smaller than any other sums or is the same as the other sum and the smallest, the process proceeds to step S2. In step S2, when the local node is currently performing path switching or pass-through, the switching control unit 16 terminates the path switching or pass-through. The term "pass-through" as used herein refers to transmitting data, received over the protection wavelengths, through to an adjacent node over the protection wavelengths.

When the sum of the received number of working failures and the received number of protection failures and the sum of the detected number of working failures and the detected number of protection failures are equal to each other and the smallest, the process proceeds to step S3. In step S3, when the local node is currently performing path switching or pass-through, the switching control unit 16 maintains processing for the path switching or pass-through.

When the sum of the detected number of working failures and the detected number of protection failures is smaller than any other sums, the process proceeds to step S4. In step S4, when the path switching is currently being performed, the switching control unit 16 terminates the path switching and performs pass-through at the protection entity.

When the sum of the received number of working failures and the received number of protection failures is smaller than any other sums, the process proceeds to step S5 in which the switching control unit 16 performs path switching at the local node.

As described above, each node in the ring network is configured to determine the numbers of failures and compare the numbers in step S1 and to appropriately select and execute the restoration processing in steps S2 to S5 on the basis of the results of the comparison.

With this configuration, even when multiple failures occur in a network employing the group protection scheme, a largest number of paths can be restored in the entire network. Thus, it is possible to improve the quality and reliability of transmission.

A description will be given next in conjunction with a specific example. First, an example of a protection operation when the restoration processing (the path switching is terminated and the pass-through is performed at the protection entity) in step S4 in the flowchart illustrated in FIG. 13 and the restoration processing (the path switching) in step S5 are selected will be described with reference to FIGS. 14 to 20.

Figure 14:
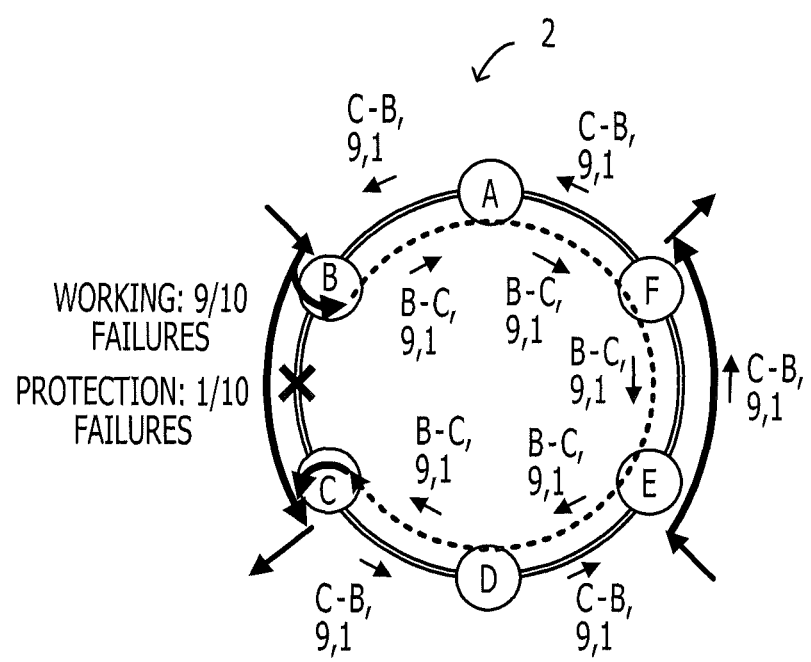
FIG. 14 illustrates a state in which the APS data is transferred when a single failure occurs.

FIG. 14 illustrates a state in which the APS data is transferred when a single failure occurs. A description below is given assuming that, in the example of the ring network 2 including the nodes A to F, ten working wavelengths and ten protection wavelengths constitute one group, the node B is a source node, the node C is a destination node of the node B, the node E is a source node, the node F is a destination node of the node E, and paths are established for the respective wavelengths.

In this case, nine of the ten working wavelengths between the nodes B and C have failures, one of the ten protection wavelengths has a failure, and the path switching is performed at the nodes B and C. Thus, upon detecting the failures, the node B transmits APS data "B-C,9,1" to the node C along a long route that goes through the nodes A, F, E, and D. Similarly, the node C transfers APS data "C-B,9,1" to the node B along a long route that goes through the nodes D, E, F, and A.

FIGS. 15A to 15D illustrate values of APS data. The node A has a node ID of 0001(1), the node B has a node ID of 0010(2), the node C has a node ID of 0011(3), the node D has a node ID of 0100(4), the node E has a node ID of 0101(5), and the node F has a node ID of 0110(6), where the numeric value in each bracket "( )" is a decimal number.

APS data d1 illustrated in FIG. 15A is transferred in the order of the node B, the node A, the node F, the node E, the node D, and the node C. APS data d2 illustrated in FIG. 15B is transferred from the node B to the node C. APS data d3 illustrated in FIG. 15C is transferred in the order of the node C, the node D, the node E, the node F, the node A, and the node B. APS data d4 illustrated in FIG. 15D is transferred from the node C to the node B.

In the APS data d1, code (1011) of SF-R (signal failure-ring) for requesting processing adapted for a failure is set as the bridge request code, the node C is set as the destination node, the node B is set as the source node, "1" is set as L&S (Long: along a long route), and code (010) of br&sw (bridge&switch) indicating the state of path switching is set as the status. The number of working failures is set to "9" and the number of protection failures is set to "1".

In the APS data d2, code "1011" of SF-R is set as the bridge request code, the node C is set as the destination node, the node B is set as the source node, "0" (Short: along a short route) is set as the L&S, and code "010" of br&sw is set as the status. The number of working failures is set to "9" and the number of protection failures is set to "1".

In the APS data d3, code "1011" of SF-R is set as the bridge request code, the node B is set as the destination node, the node C is set as the source node, "1" (Long) is set as the L&S, and code "010" of br&sw is set as the status. The number of working failures is set to "9" and the number of protection failures is set to "1"

In the APS data d4, code "1011" of SF-R is set as the bridge request code, the node B is set as the destination node, the node C is set as the source node, "0" (Short) is set as the L&S, and code "010" of br&sw is set as the status. The number of working failures is set to "9" and the number of protection failures is set to "1".

Figure 16:
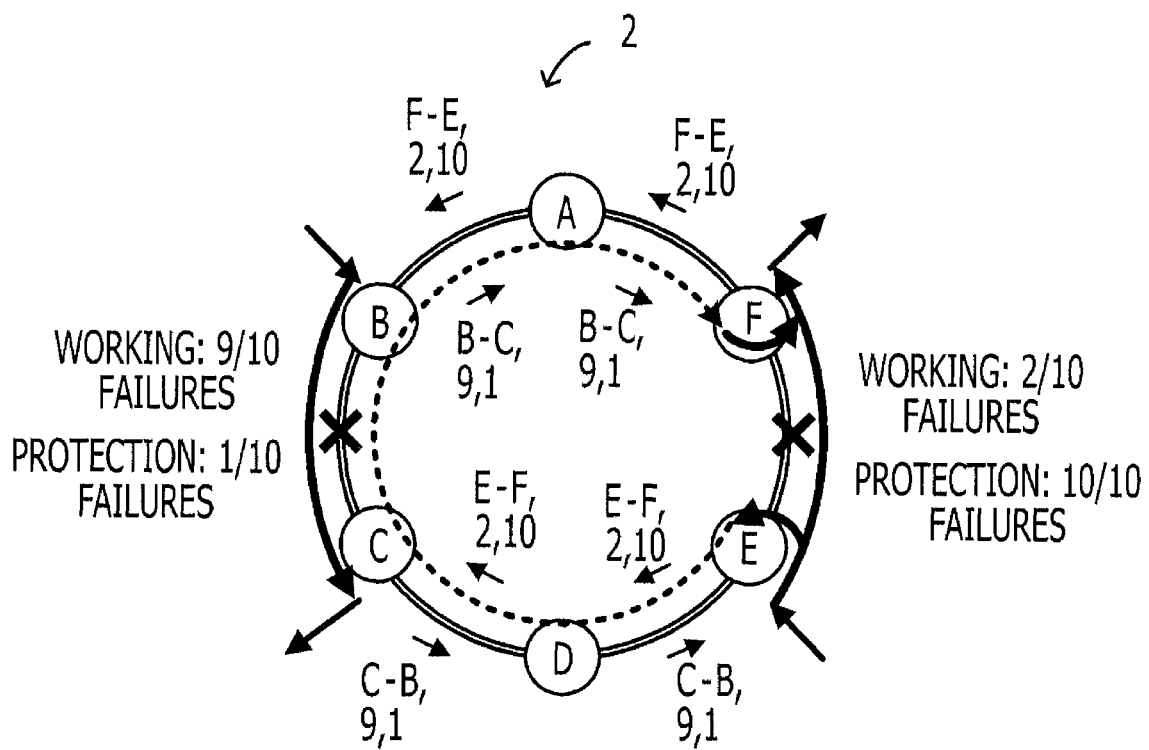
FIG. 16 illustrates a state in which the APS data is transferred when multiple failures occur.

FIG. 16 illustrates a state in which APS data is transferred when multiple failures occur. It is assumed that, in the state illustrated in FIG. 14, failures occur in two of the ten wavelengths at the working entity and failures occur in all of the ten wavelengths at the protection entity between the nodes E and F.

Upon detecting the failures, the node E sets APS data "E-F,2,10" indicating that the number of working failures is 2 and the number of protection failures is 10 and transmits the APS data to the node F along a long route that goes through the nodes D, C, B, and A. Similarly, the node F transmits APS data "F-E,2,10" to the node E along a long route that goes through the nodes A, B, C, and D.

In restoration processing performed when multiple failures as illustrated in FIG. 16 occur, the nodes B and C terminate the path switching executed when the initial failures occurred therebetween and also perform pass-through therebetween. The nodes E and F then execute path switching (described below with reference to FIGS. 19 and 20).

Figure 17A:
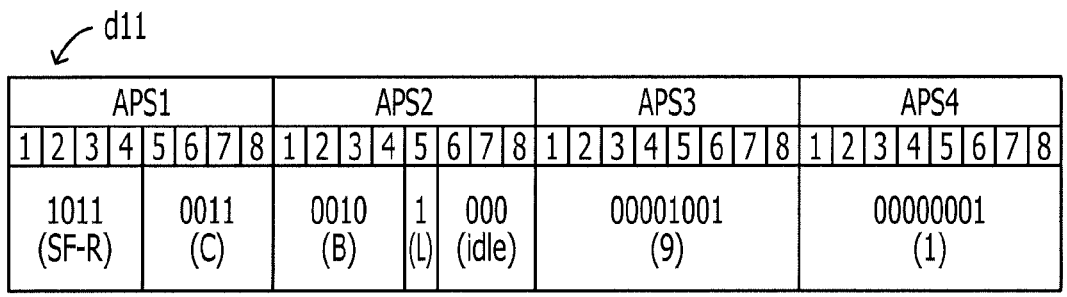
FIGS. 17A to 17D illustrate values of APS data.
Figure 17B:
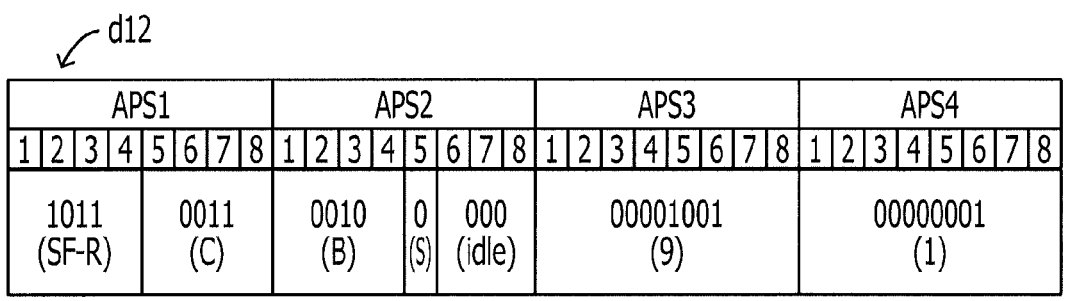
Figure 17C:
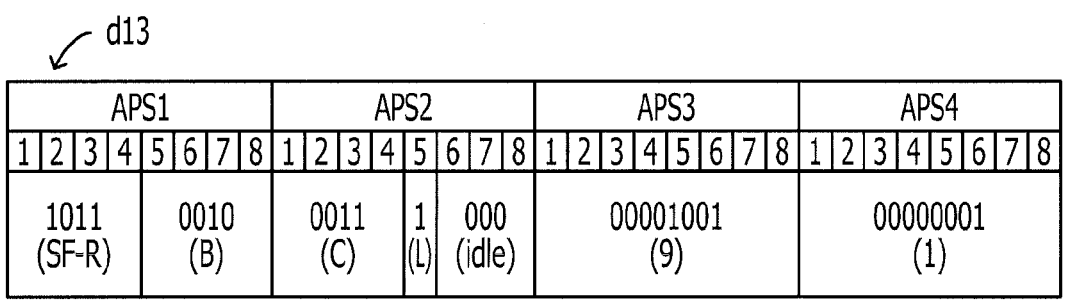
Figure 17D:
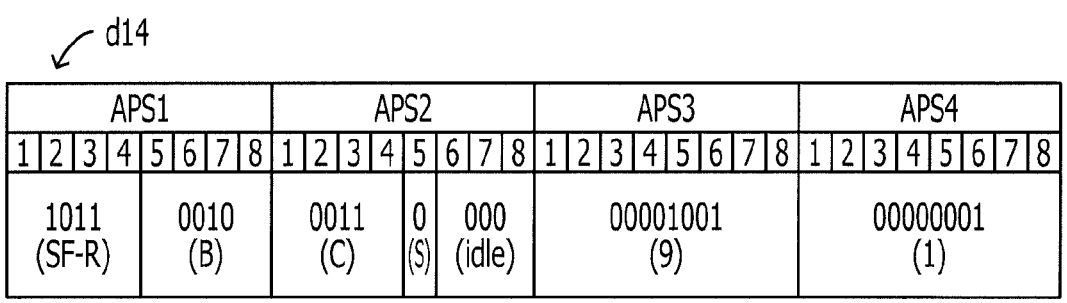

FIGS. 17A to 17D and FIGS. 18A to 18D illustrate values of APS data. APS data d11 illustrated in FIG. 17A is transferred in the order of B, A, and F. APS data d12 illustrated in FIG. 17B is transferred from the node B to the node C. APS data d13 illustrated in FIG. 17C is transferred in the order of C, D, and E. APS data d14 illustrated in FIG. 17D is transferred from the node C to the node B.

In the APS data d11, code "1011" of SF-R is set as the bridge request code, the node C is set as the destination node, the node B is set as the source node, "1" (Long) is set as the L&S, and code "000" of idle corresponding to the pass-through state is set as the status. The number of working failures is set to "9" and the number of protection failures is set to "1".

In the APS data d12, code "1011" of SF-R is set as the bridge request code, the node C is set as the destination node, the node B is set as the source node, "0" (Short) is set as the L&S, and code "000" of idle is set as the status. The number of working failures is set to "9" and the number of protection failures is set to "1".

In the APS data d13, code "1011" of SF-R is set as the bridge request code, the node B is set as the destination node, the node C is set as the source node, "1" (Long) is set as the L&S, and code "000" of idle is set as the status. The number of working failures is set to "9" and the number of protection failures is set to "1".

In the APS data d14, code "1011" of SF-R is set as the bridge request code, the node B is set as the destination node, the node C is set as the source node, "0" (Short) is set as the L&S, and code "000" of idle is set as the status. The number of working failures is set to "9" and the number of protection failures is set to "1".

APS data d15 illustrated in FIG. 18A is transferred in the order of F, A, and B. APS data d16 illustrated in FIG. 18B is transferred from the node F to the node E. APS data d17 illustrated in FIG. 18C is transferred in the order of E, D, and C. APS data d18 illustrated in FIG. 18D is transferred from the node E to the node F.

In the APS data d15, code "1011" of SF-R is set as the bridge request code, the node E is set as the destination node, the node F is set as the source node, "1" (Long) is set as the L&S, and code "010" of br&sw is set as the status. The number of working failures is set to "2" and the number of protection failures is set to "10"

In the APS data d16, code "1011" of SF-R is set as the bridge request code, the node E is set as the destination node, the node F is set as the source node, "0" (Short) is set as the L&S, and code "010" of br&sw is set as the status. The number of working failures is set to "2" and the number of protection failures is set to "10"

In the APS data d17, code "1011" of SF-R is set as the bridge request code, the node F is set as the destination node, the node E is set as the source node, "1" (Long) is set as the L&S, and code "010" of br&sw is set as the status. The number of working failures is set to "2" and the number of protection failures is set to "10"

In the APS data d18, code "1011" of SF-R is set as the bridge request code, the node F is set as the destination node, the node E is set as the source node, "0" (Short) is set as the L&S, and code "010" of br&sw is set as the status. The number of working failures is set to "2" and the number of protection failures is set to "10"

Figure 19:
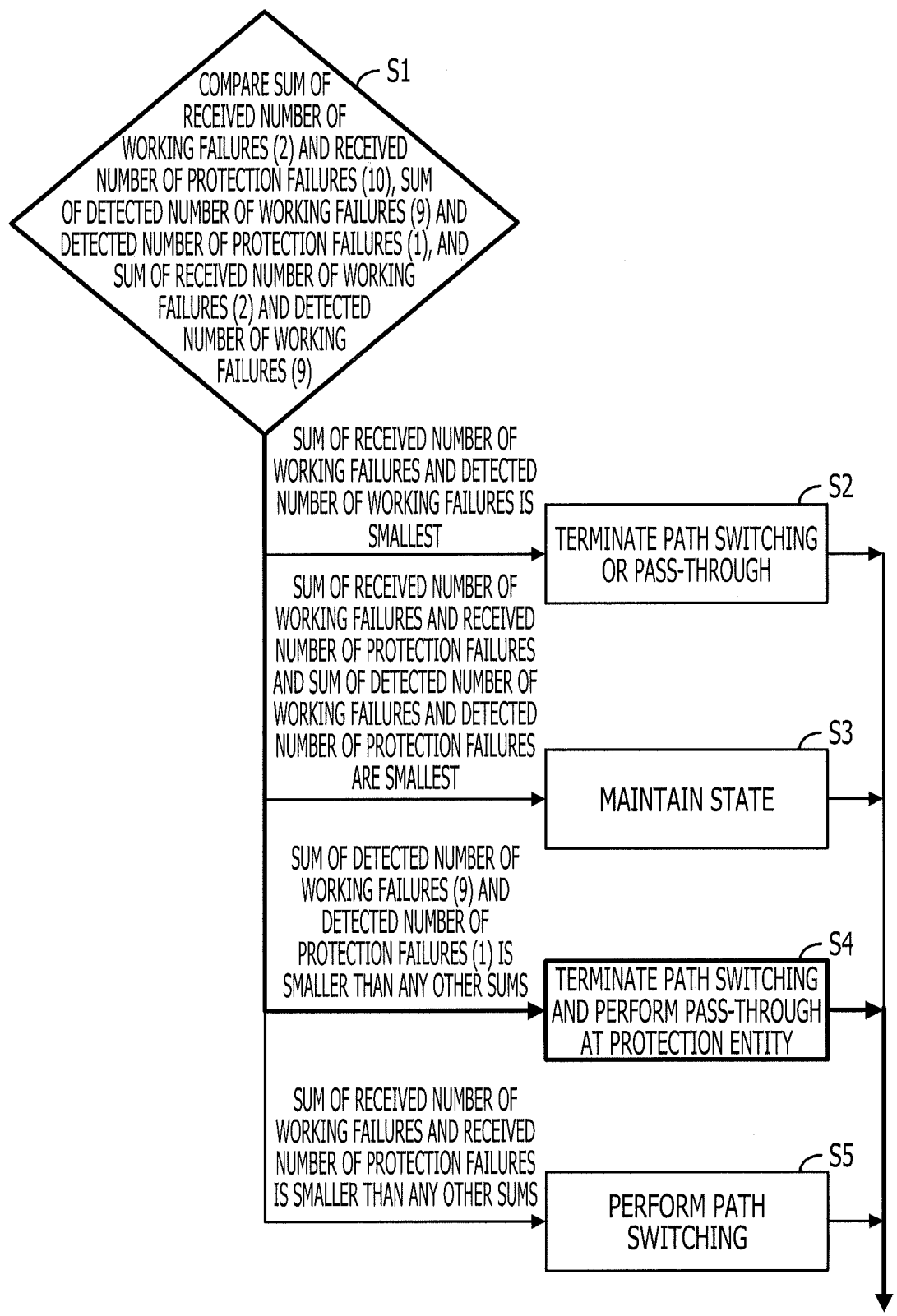
FIG. 19 is a flowchart illustrating restoration control.

FIG. 19 is a flowchart illustrating restoration control. In the flowchart, with respect to control performed by the nodes B and C during multiple failures in FIG. 16, specific numeric values of the numbers of failures to be compared are illustrated and the corresponding processing is denoted by bold line frames.

In the comparison processing in step S1, at the nodes B and C, the sum of the received number of working failures and the received number of protection failures is 12 (=2+10), the sum of the detected number of working failures and the detected number of protection failures is 10 (=9+1), and the sum of the received number of working failures and the detected number of working failures is 11 (=2+9). In this case, the sum of the detected number of working failures and the detected number of protection failures is smaller than any other sums.

Thus, the process proceeds to processing in step S4 in which the local node performs pass-through at the protection entity (i.e., the node B performs pass-through at the protection entity and the node C also performs pass-through at the protection entity). In this case, since the nodes B and C have been performing the path switching, the path switching is terminated.

Figure 20:
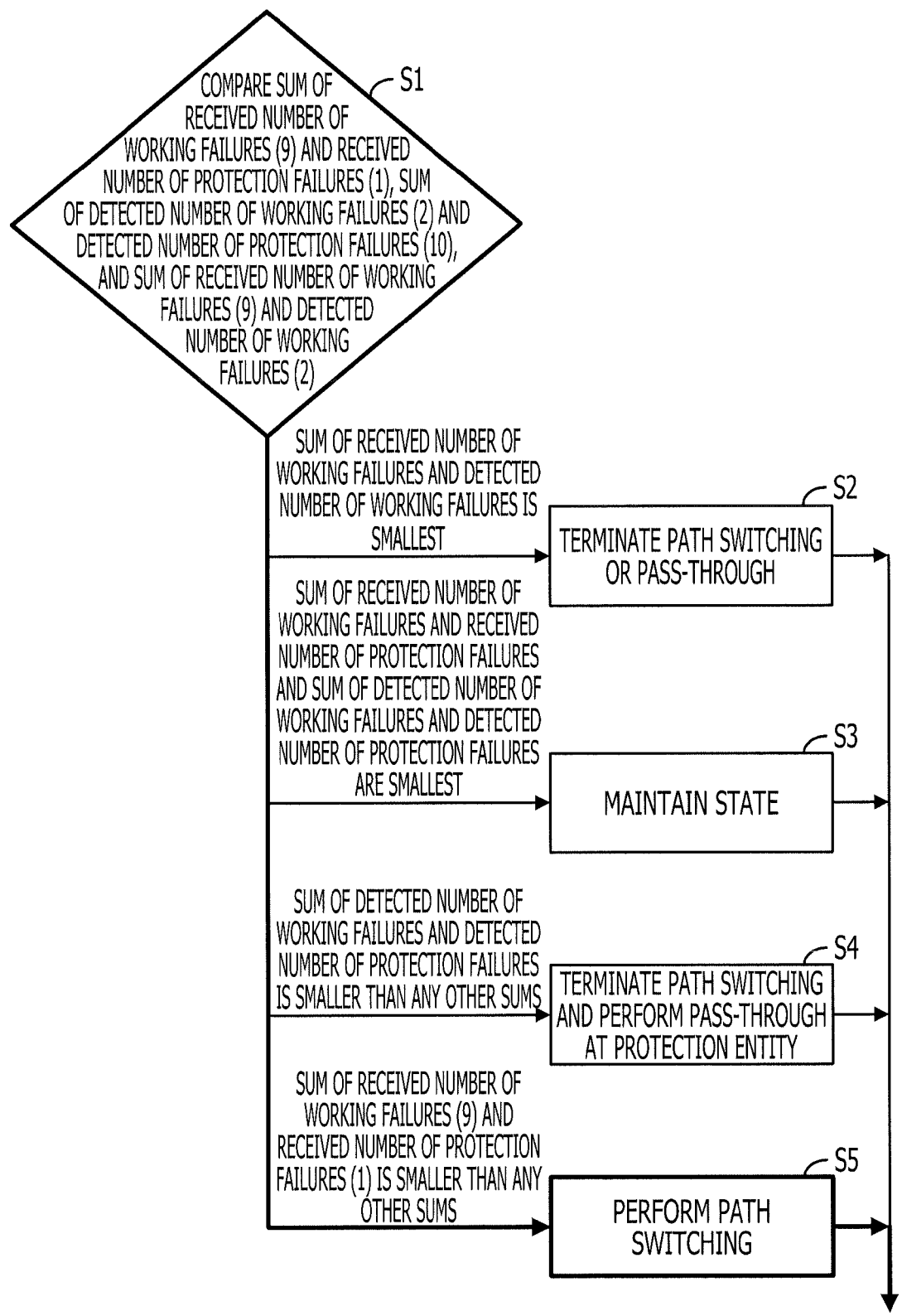
FIG. 20 is a flowchart illustrating restoration control.

FIG. 20 is a flowchart illustrating restoration control. In the flowchart, with respect to control performed by the nodes E and F during multiple failures in FIG. 16, specific numeric values of the numbers of failures to be compared are illustrated and the corresponding processing is denoted by bold line frames.

In the comparison processing in step S1, at the nodes E and F, the sum of the received number of working failures and the received number of protection failures is 10 (=9+1), the sum of the detected number of working failures and the detected number of protection failures is 12 (=2+10), and the sum of the received number of working failures and the detected number of working failures is 11 (=9+2). In this case, the sum of the received number of working failures and the received number of protection failures is smaller than any other sums. Thus, the process proceeds to processing in step S5 in which the local nodes perform path-switching processing (the nodes E and F perform path switching).

Figure 21:
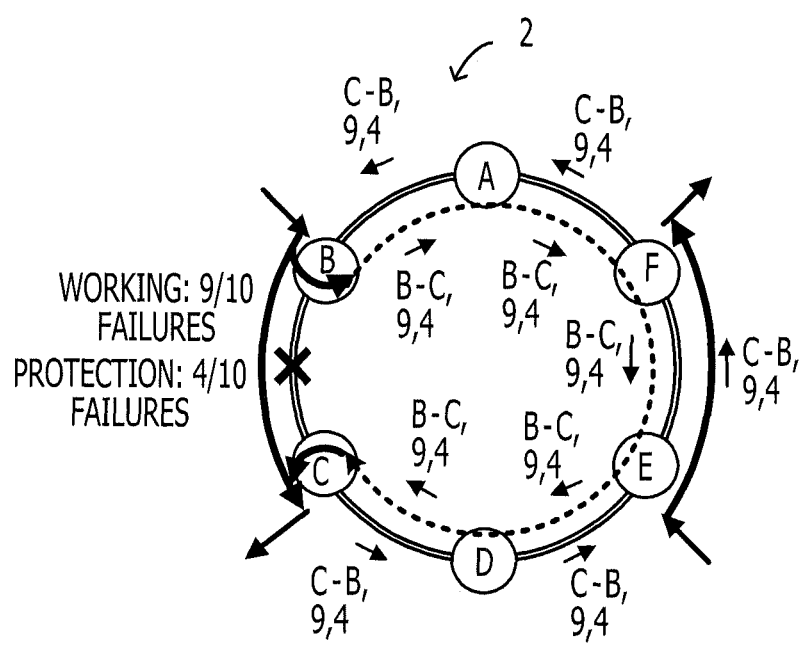
FIG. 21 illustrates a state in which the APS data is transferred when a single failure occurs.

An example of protection operation when the restoration processing (the path switching or the pass-through is terminated) in step S2 is selected in the flowchart illustrated in FIG. 13 will be described next with reference to FIGS. 21 to 27. FIG. 21 illustrates a state in which APS data is transferred when a single failure occurs.

In the ring network 2, nine of the ten working wavelengths between the nodes B and C have failures, four of the ten protection wavelengths have failures, and the nodes B and C perform path switching.

Thus, upon detecting the failures, the node B transmits APS data "B-C,9,4" to the node C along a long route that goes through the nodes A, F, E, and D. Similarly, the node C transfers APS data "C-B,9,4" to the node B along a long route that goes through the nodes D, E, F, and A.

FIGS. 22A to 22D illustrate values of APS data. APS data d21 illustrated in FIG. 22A is transferred in the order of the node B, the node A, the node F, the node E, the node D, and the node C. APS data d22 illustrated in FIG. 22B is transferred from the node B to the node C. APS data d23 illustrated in FIG. 22C is transferred in the order of the node C, the node D, the node E, the node F, the node A, and the node B. APS data d24 illustrated in FIG. 22D is transferred from the node C to the node B.

In the APS data d21, code "1011" of SF-R is set as the bridge request code, the node C is set as the destination node, the node B is set as the source node, "1" (Long) is set as the L&S, and code "010" of br&sw is set as the status. The number of working failures is set to "9" and the number of protection failures is set to "4".

In the APS data d22, code "1011" of SF-R is set as the bridge request code, the node C is set as the destination node, the node B is set as the source node, "0" (Short) is set as the L&S, and code "010" of br&sw is set as the status. The number of working failures is set to "9" and the number of protection failures is set to "4".

In the APS data d23, code "1011" of SF-R is set as the bridge request code, the node B is set as the destination node, the node C is set as the source node, "1" (Long) is set as the L&S, and code "010" of br&sw is set as the status. The number of working failures is set to "9" and the number of protection failures is set to "4".

In the APS data d24, code "1011" of SF-R is set as the bridge request code, the node B is set as the destination node, the node C is set as the source node, "0" (Short) is set as the L&S, and code "010" of br&sw is set as the status. The number of working failures is set to "9" and the number of protection failures is set to "4".

Figure 23:
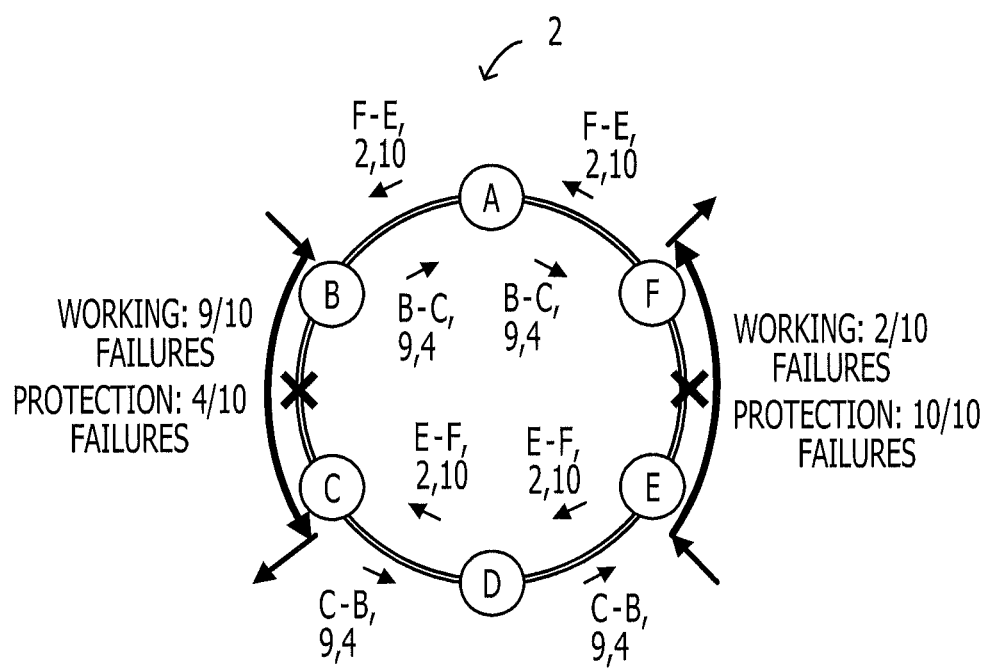
FIG. 23 illustrates a state in which the APS data is transferred when multiple failures occur.

FIG. 23 illustrates a state in which APS data is transferred when multiple failures occur. It is assumed that, in the state illustrated in FIG. 21, failures occur in two of the ten working wavelengths and failures occur in all of the ten protection wavelengths between the nodes E and F.

Thus, upon detecting the failures, the node F transmits APS data "F-E,2,10" to the node E along a long route that goes through the nodes A, B, C, and D. Similarly, the node E transfers APS data "E-F,2,10" to the node F along a long route that goes through the nodes D, C, B, and A.

In the restoration processing when multiple failures as illustrated in FIG. 23 occur, all of the nodes A to F terminate the path switching or the pass-through (described below in FIGS. 26 and 27).

FIGS. 24A to 24D and FIGS. 25A to 25D illustrate values of APS data. APS data d31 illustrated in FIG. 24A is transferred in the order of B, A, and F. APS data d32 illustrated in FIG. 24B is transferred from the node B to the node C. APS data d33 illustrated in FIG. 24C is transferred in the order of C, D, and E. APS data d34 illustrated in FIG. 24D is transferred from the node C to the node B.

In the APS data d31, code "1011" of SF-R is set as the bridge request code, the node C is set as the destination node, the node B is set as the source node, "1" (Long) is set as the L&S, and code "000" of idle is set as the status. The number of working failures is set to "9" and the number of protection failures is set to "4".

In the APS data d32, code "1011" of SF-R is set as the bridge request code, the node C is set as the destination node, the node B is set as the source node, "0" (Short) is set as the L&S, and code "000" of idle is set as the status. The number of working failures is set to "9" and the number of protection failures is set to "4".

In the APS data d33, code "1011" of SF-R is set as the bridge request code, the node B is set as the destination node, the node C is set as the source node, "1" (Long) is set as the L&S, and code "000" of idle is set as the status. The number of working failures is set to "9" and the number of protection failures is set to "4".

In the APS data d34, code "1011" of SF-R is set as the bridge request code, the node B is set as the destination node, the node C is set as the source node, "0" (Short) is set as the L&S, and code "000" of idle is set as the status. The number of working failures is set to "9" and the number of protection failures is set to "4".

APS data d35 is transferred in the order of F, A, and B. APS data d36 is transferred from the node F to the node E. APS data d37 is transferred in the order of E, D, and C. APS data d38 is transferred from the node E to the node F.

In the APS data d35, code "1011" of SF-R is set as the bridge request code, the node E is set as the destination node, the node F is set as the source node, "1" (Long) is set as the L&S, and code "000" of idle is set as the status. The number of working failures is set to "2" and the number of protection failures is set to "10".

In the APS data d36, code "1011" of SF-R is set as the bridge request code, the node E is set as the destination node, the node F is set as the source node, "0" (Short) is set as the L&S, and code "000" of idle is set as the status. The number of working failures is set to "2" and the number of protection failures is set to "10".

In the APS data d37, code "1011" of SF-R is set as the bridge request code, the node F is set as the destination node, the node E is set as the source node, "1" (Long) is set as the L&S, and code "000" of idle is set as the status. The number of working failures is set to "2" and the number of protection failures is set to "10".

In the APS data d38, code "1011" of SF-R is set as the bridge request code, the node F is set as the destination node, the node E is set as the source node, "0" (Short) is set as the L&S, and code "000" of idle is set as the status. The number of working failures is set to "2" and the number of protection failures is set to "10".

Figure 26:
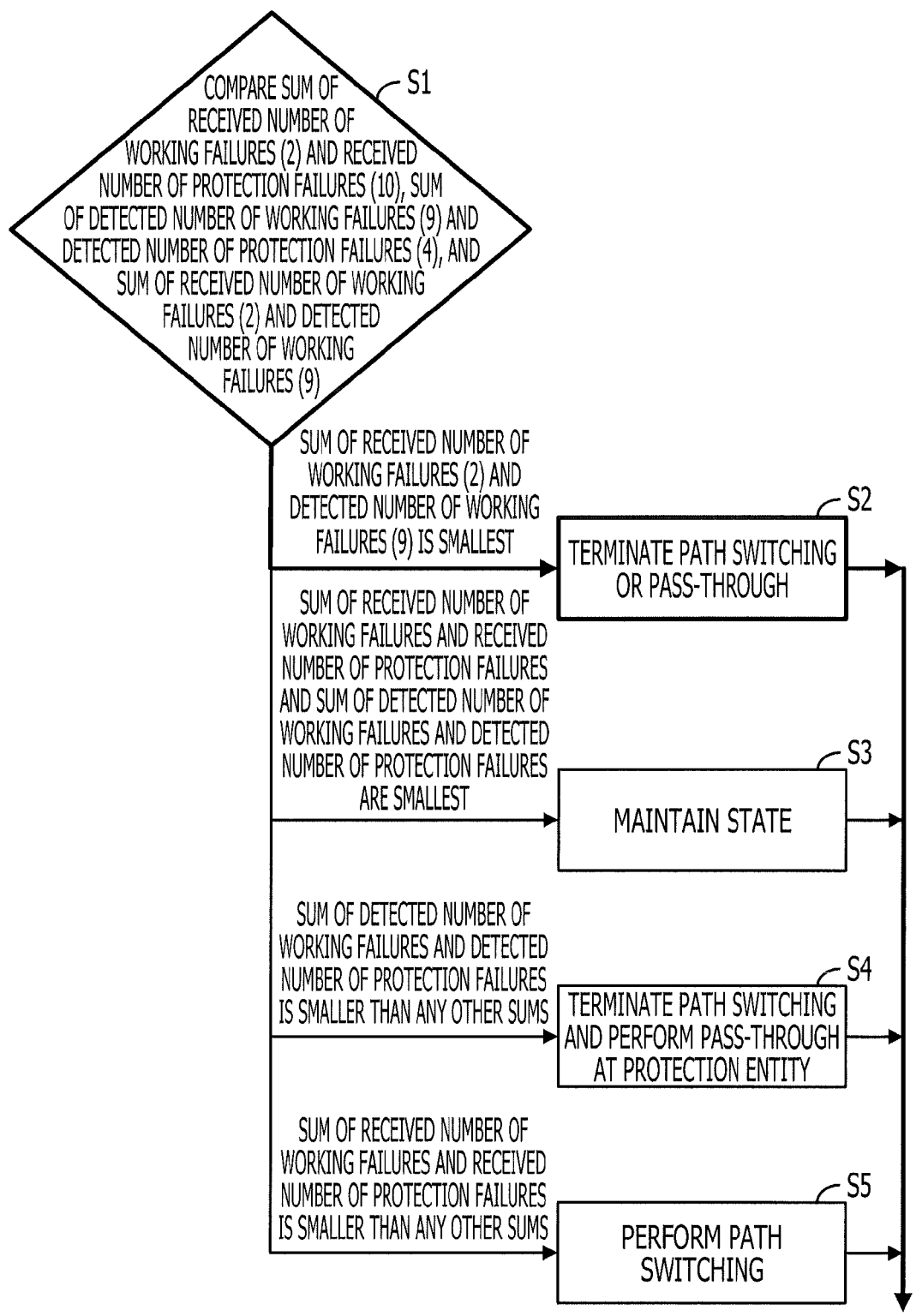
FIG. 26 is a flowchart illustrating restoration control.

FIG. 26 is a flowchart illustrating restoration control. In the flowchart, with respect to control performed by the nodes B and C during multiple failures in FIG. 23, specific numeric values of the numbers of failures to be compared are illustrated and the corresponding processing is denoted by bold line frames.

In the comparison processing in step S1, at the nodes B and C, the sum of the received number of working failures and the received number of protection failures is 12 (=2+10), the sum of the detected number of working failures and the detected number of protection failures is 13 (=9+4), and the sum of the received number of working failures and the detected number of working failures is 11 (=2+9). In this case, the sum of the received number of working failures and the detected number of working failures is the smallest.

Thus, the process proceeds to step S2 in which the path switching is terminated since the nodes B and C have been performing the path switching.

Figure 27:
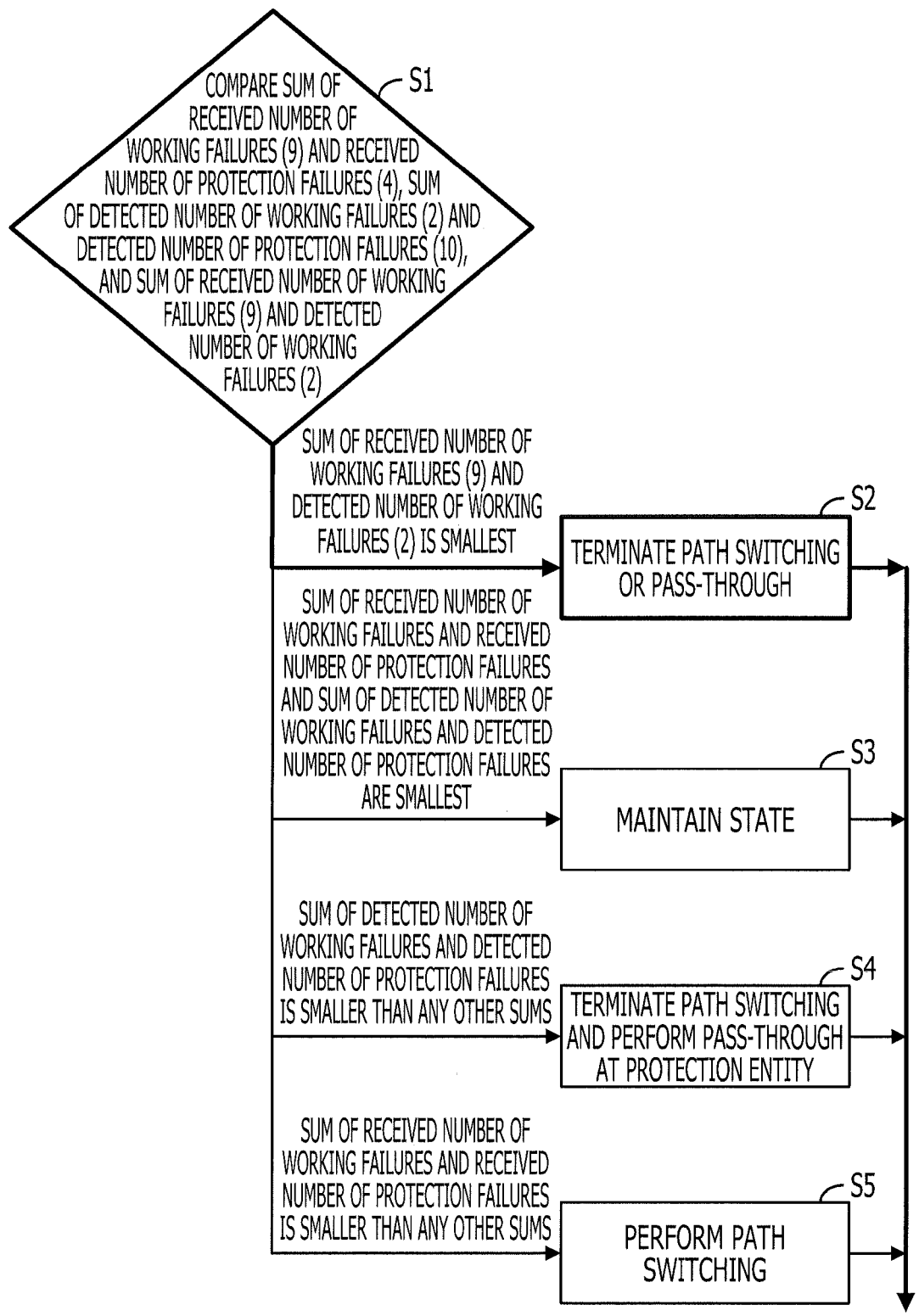
FIG. 27 is a flowchart illustrating restoration control.

FIG. 27 is a flowchart illustrating restoration control. In the flowchart, with respect to control performed by the nodes E and F during multiple failures in FIG. 23, specific numeric values of the numbers of failures to be compared are illustrated and the corresponding processing is denoted by bold line frames.

In the comparison processing in step S1, at the nodes E and F, the sum of the received number of working failures and the received number of protection failures is 13 (=9+4), the sum of the detected number of working failures and the detected number of protection failures is 12 (=2+10), and the sum of the received number of working failures and the detected number of working failures is 11 (=9+2). In this case, the sum of the received number of working failures and the detected number of working failures is the smallest.

Thus, the process proceeds to step S2 in which the pass-through is terminated since the nodes E and F have been performing the pass-through.

An example of protection operation when the restoration processing in step S3 (i.e., the maintaining of the current state) is selected in the flowchart illustrated in FIG. 13 will be described next with reference to FIGS. 28 to 31. A state when a single failure occurs is similar to the state illustrated in FIG. 14.

Figure 28:
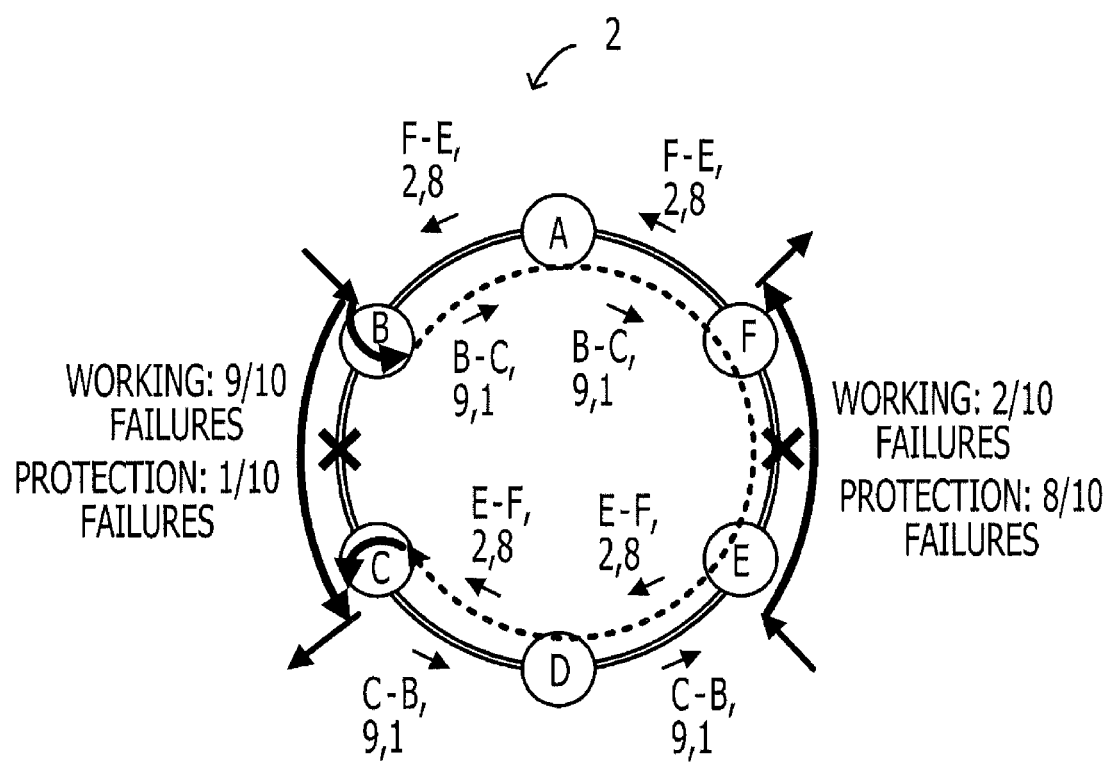
FIG. 28 illustrates a state in which the APS data is transferred when multiple failures occur.

FIG. 28 illustrates a state in which APS data is transferred when multiple failures occur. It is assumed that, in the state illustrated in FIG. 14, failures occur in two of the ten working wavelengths and failures occur in eight of the ten protection wavelengths between the nodes E and F.

Thus, upon detecting the failures, the node F transmits APS data "F-E,2,8" to the node E along a long route that goes through the nodes A, B, C, and D. Similarly, the node E transfers APS data "E-F,2,8" to the node F along a long route that goes through the nodes D, C, B, and A.

In the restoration processing when multiple failures as illustrated in FIG. 28 occur, all of the nodes A to F maintain the current states (described below in FIGS. 30 and 31).

FIGS. 29A to 29D illustrate values of APS data. APS data d41 illustrated in FIG. 29A is transferred in the order of F, A, and B. APS data d42 illustrated in FIG. 29B is transferred from the node F to the node E. APS data d43 illustrated in FIG. 29C is transferred in the order of E, D, and C. APS data d44 illustrated in FIG. 29D is transferred from the node E to the node F.

The APS data transferred in the order of the nodes B, A, and F is similar to the APS data d1 illustrated in FIG. 15A. The APS data transferred from the node B to the node C is similar to the APS data d2 illustrated in FIG. 15B.

The APS data transferred in the order of the nodes C, D, and E is similar to the APS data d3 illustrated in FIG. 15C. The APS data transferred from the node C to the node B is similar to the APS data d4 illustrated in FIG. 15D.

In the APS data d41, code "1011" of SF-R is set as the bridge request code, the node E is set as the destination node, the node F is set as the source node, "1" (Long) is set as the L&S, and code "000" of idle is set as the status. The number of working failures is set to "2" and the number of protection failures is set to "8".

In the APS data d42, code "1011" of SF-R is set as the bridge request code, the node E is set as the destination node, the node F is set as the source node, "0" (Short) is set as the L&S, and code "000" of idle is set as the status. The number of working failures is set to "2" and the number of protection failures is set to "8".

In the APS data d43, code "1011" of SF-R is set as the bridge request code, the node F is set as the destination node, the node E is set as the source node, "1" (Long) is set as the L&S, and code "000" of idle is set as the status. The number of working failures is set to "2" and the number of protection failures is set to "8".

In the APS data d44, code "1011" of SF-R is set as the bridge request code, the node F is set as the destination node, the node E is set as the source node, "0" (Short) is set as the L&S, and code "000" of idle is set as the status. The number of working failures is set to "2" and the number of protection failures is set to "8".

FIG. 30 is a flowchart illustrating restoration control. In the flowchart, with respect to control performed by the nodes B and C during multiple failures in FIG. 28, specific numeric values of the numbers of failures to be compared are illustrated and the corresponding processing is denoted by bold line frames.

In the comparison processing in step S1, at the nodes B and C, the sum of the received number of working failures and the received number of protection failures is 10 (=2+8), the sum of the detected number of working failures and the detected number of protection failures is 10 (=9+1), and the sum of the received number of working failures and the detected number of working failures is 11 (=2+9). In this case, the sum of the received number of working failures and the received number of protection failures and the sum of the detected number of working failures and the detected number of protection failures are the smallest.

Thus, the process proceeds to processing in step S3 and the current state is maintained. That is, since the nodes B and C have been executing the path switching, the path switching is continued.

FIG. 31 is a flowchart illustrating restoration control. In the flowchart, with respect to control performed by the nodes E and F during multiple failures in FIG. 28, specific numeric values of the numbers of failures to be compared are illustrated and the corresponding processing is denoted by bold line frames.

In the comparison processing in step S1, at the nodes E and F, the sum of the received number of working failures and the received number of protection failures is 10 (=9+1), the sum of the detected number of working failures and the detected number of protection failures is 10 (=2+8), and the sum of the received number of working failures and the detected number of working failures is 11 (=9+2). In this case, the sum of the received number of working failures and the received number of protection failures and the sum of the detected number of working failures and the detected number of protection failures are the smallest. Thus, the process proceeds to processing in step S3 and the current state is maintained. That is, since the nodes E and F have been performing the pass-through, the pass-through is maintained.

A modification will now be described. This modification is directed to an example in which the number-of-failures comparison processing described above is simplified. In this modification, without distinction between the "working" and the "protection", restoration processing by which the number of paths restored is the largest is determined according to the result of the comparison between the received number of failures and the detected number of failures.

FIG. 32 illustrates the format of APS data. Each piece of APS data has a total of 4 bytes, i.e., APS1 to APS4 each having 1 byte. The APS3 and APS4 are different from those illustrated in FIG. 11.

In the APS data for use in the modification, the number of failures is set in the field of bits 1 to 8 in the APS3 at the third byte to indicate a sum of the number of failures in the wavelengths assigned as working wavelengths in the group and the number of failures in the wavelengths assigned as protection wavelengths between the source node and the destination node. The field of bits 1 to 8 in the APS4 at the fourth byte is a reserved area.

In this case, one node that detects a failure sets, in the "number-of-failures" field in the APS data, the sum of the number of working failures and the number of protection failures and transfers the APS data to the adjacent node through a detour route.

Upon receiving the APS data, this adjacent node compares the sum of the number of working failures and the number of protection failures detected by the local node (i.e., this adjacent node) with the number of failures which is contained in the received APS data. In accordance with the result of the comparison, the local node determines restoration processing to be executed thereby.

Figure 33:
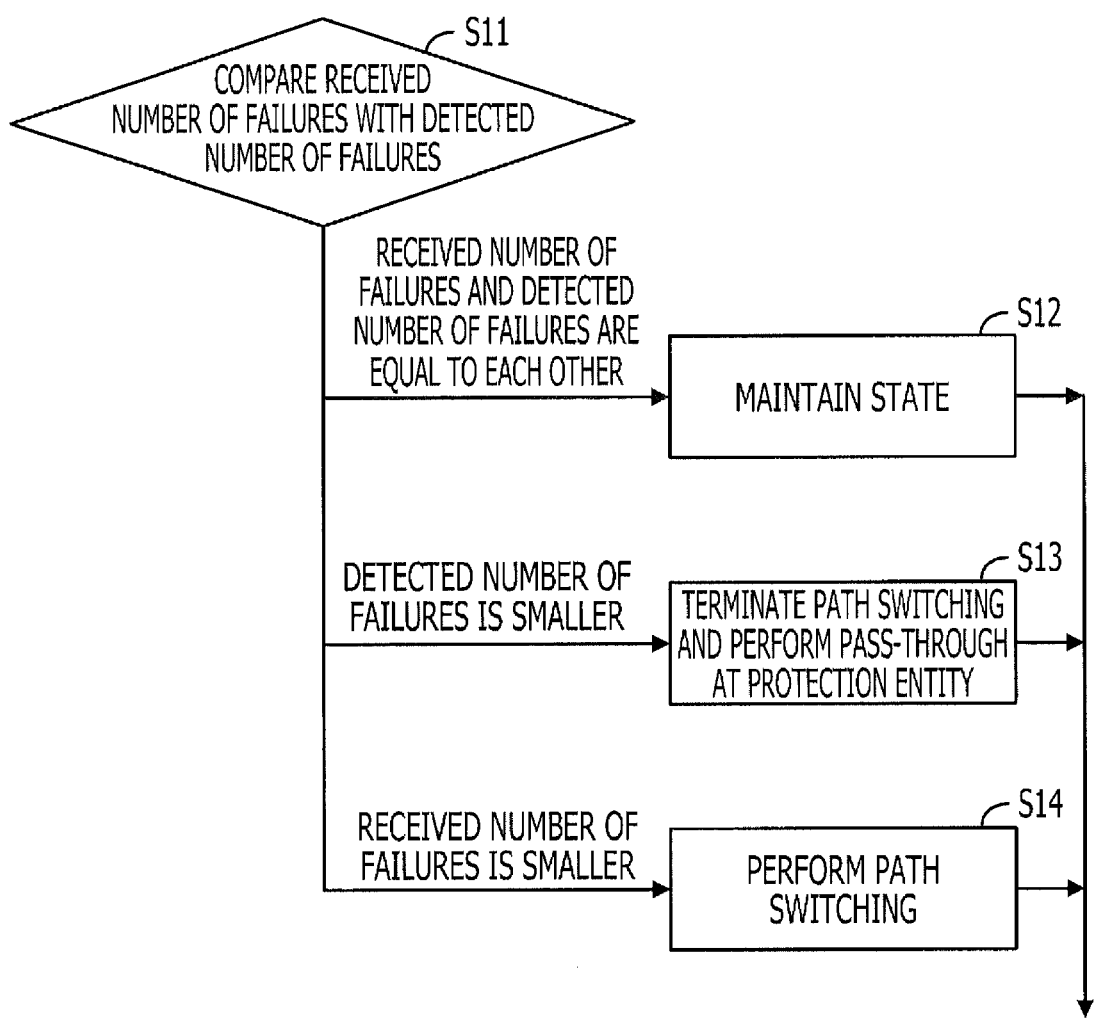
FIG. 33 is a flowchart illustrating restoration control.

FIG. 33 is a flowchart illustrating restoration control. In FIG. 33, the "received number of failures" refers to the number of failures which is contained in the APS data transmitted from another and received and the "detected number of failures" refers to the sum of the number of working failures and the number of protection failures detected by the local node.

In step S11, the switching control unit 16 compares the received number of failures with the detected number of failures.

When the received number of failures and the detected number of failures are equal to each other, the process proceeds to step S12. In step S12, when the local node is performing path switching or pass-through, the switching control unit 16 therein maintains the path switching or the pass-through.

When the detected number of failures is smaller than the received number of failures, the process proceeds to step S13. In step S13, when the path switching is currently being performed, the path switching is terminated and the pass-through is performed at the protection entity.

When the received number of failures is smaller than the detected number of failures, the process proceeds to step S14 in which the local node performs path switching.

As described above, each node in the ring network is configured to determine the numbers of failures and compare the numbers in step S11 and to appropriately select the restoration processing in steps S12 to S14 on the basis of the results of the comparison. With this arrangement, when multiple failures occur, a largest number of paths can be restored in the entire network. Thus, it is possible to improve the quality and reliability of transmission.

A description will be given next in conjunction with a specific example. First, an example of the protection operation when the restoration processing (i.e., the maintaining of the current state) in step S12 is selected in the flowchart illustrated in FIG. 33 will be described next with reference to FIGS. 34 to 38.

Figure 34:
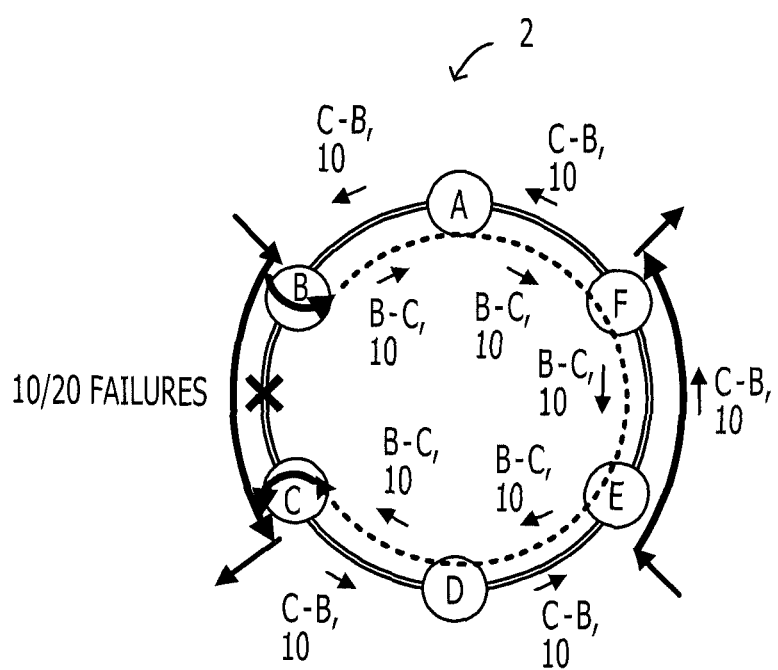
FIG. 34 illustrates a state in which the APS data is transferred when a single failure occurs.

FIG. 34 illustrates a state in which APS data is transferred when a single failure occurs. A total of ten out of 20 wavelengths in the working and protection entities between the nodes B and C have failures and the nodes B and C perform path switching.

In FIG. 34, for example, "B-C,10" represents, as information of the APS data, a source node, a destination node, and the number of failures. Thus, in this case, "B" represents a source note, "C" represents a destination node, and "10" represents the number of failures. The same notation system also applies to other similar representations in FIG. 34.

Thus, upon detecting the failures, the node B transmits APS data "B-C,10" to the node C along a long route that goes through the nodes A, F, E, and D. Similarly, the node C transfers APS data "C-B,10" to the node B along a long route that goes through the nodes D, E, F, and A.

FIGS. 35A to 35D illustrate values of APS data. APS data d51 illustrated in FIG. 35A is transferred in the order of the node B, the node A, the node F, the node E, the node D, and the node C. APS data d52 illustrated in FIG. 35B is transferred from the node B to the node C. APS data d53 illustrated in FIG. 35C is transferred in the order of the node C, the node D, the node E, the node F, the node A, and the node B. APS data d54 illustrated in FIG. 35D is transferred from the node C to the node B.

In the APS data d51, code "1011" of SF-R is set as the bridge request code, the node C is set as the destination node, the node B is set as the source node, "1" (Long) is set as the L&S, and code "010" of br&sw is set as the status. The number of failures is set to "10".

In the APS data d52, code "1011" of SF-R is set as the bridge request code, the node C is set as the destination node, the node B is set as the source node, "0" (Short) is set as the L&S, and code "010" of br&sw is set as the status. The number of failures is set to "10".

In the APS data d53, code "1011" of SF-R is set as the bridge request code, the node B is set as the destination node, the node C is set as the source node, "1" (Long) is set as the L&S, and code "010" of br&sw is set as the status. The number of failures is set to "10".

In the APS data d54, code "1011" of SF-R is set as the bridge request code, the node B is set as the destination node, the node C is set as the source node, "0" (Short) is set as the L&S, and code "010" of br&sw is set as the status. The number of failures is set to "10".

Figure 36:
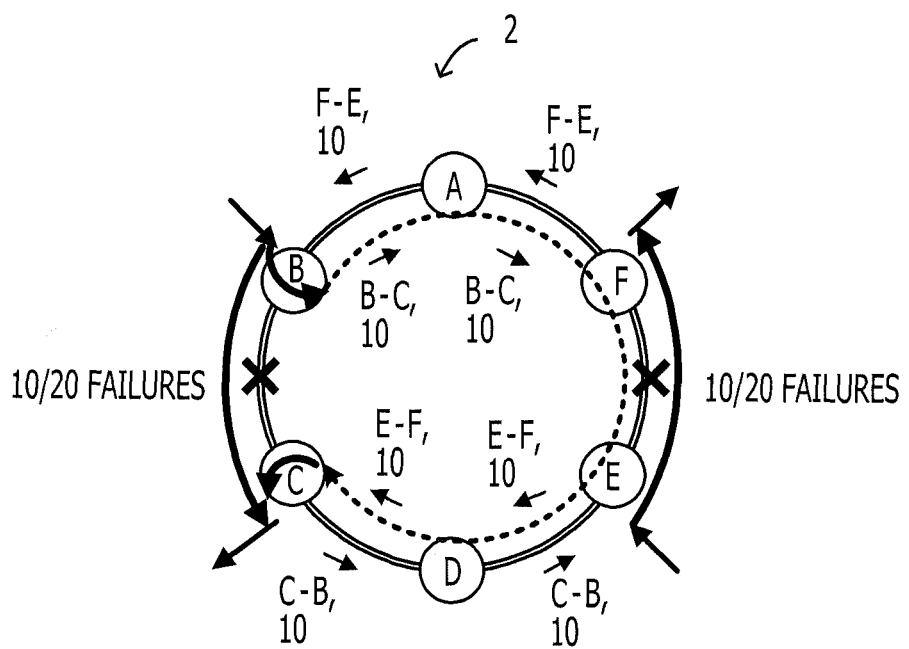
FIG. 36 illustrates a state in which the APS data is transferred when multiple failures occur.

FIG. 36 illustrates a state in which APS data is transferred when multiple failures occur. It is assumed, in the state illustrated in FIG. 34, failures further occur in ten of the 20 wavelengths between the nodes E and F.

Thus, upon detecting the failures, the node F transmits APS data "F-E,10" to the node E along a long route that goes through the nodes A, B, C, and D. Similarly, the node E transfers APS data "E-F,10" to the node F along a long route that goes through the nodes D, C, B, and A.

In the restoration processing when multiple failures as illustrated in FIG. 36 occur, all of the nodes A to F maintain the current states (described below in FIG. 38).

Figure 37A:
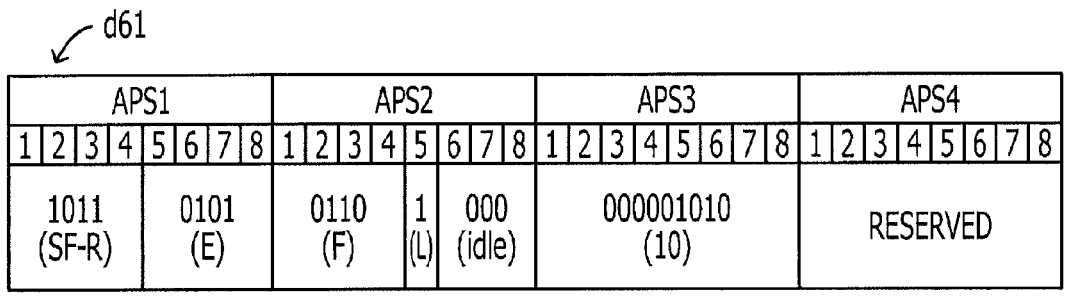
FIGS. 37A to 37D illustrate values of APS data.
Figure 37B:
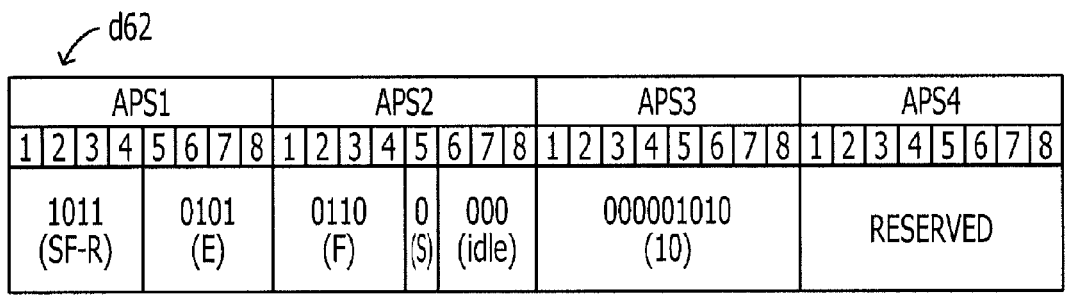
Figure 37C:
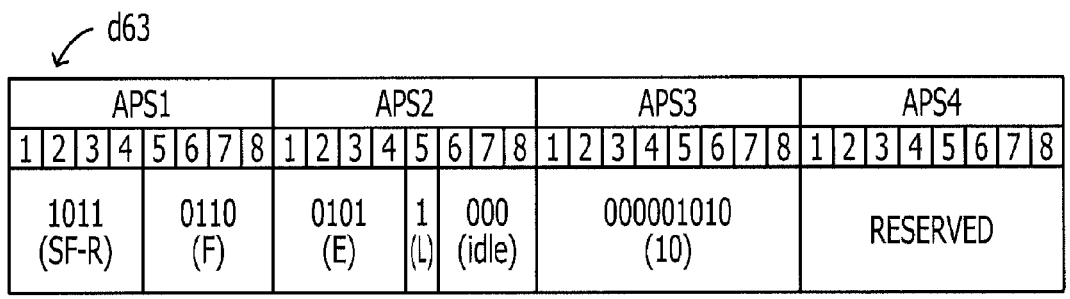
Figure 37D:
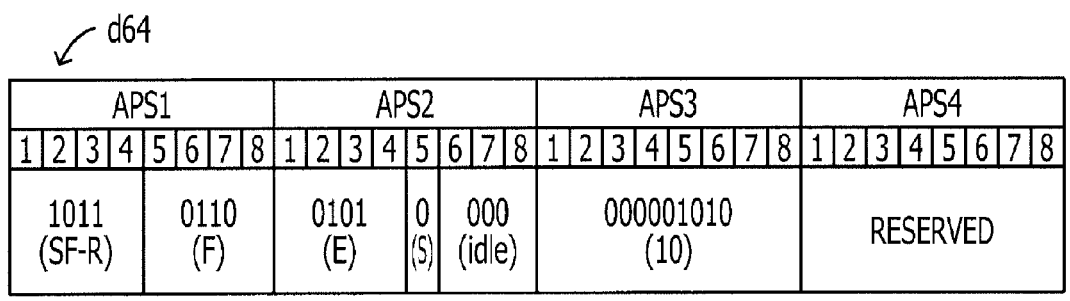

FIGS. 37A to 37D illustrate values of APS data. APS data d61 illustrated in FIG. 37A is transferred in the order of F, A, and B. APS data d62 illustrated in FIG. 37B is transferred from the node F to the node E. APS data d63 illustrated in FIG. 37C is transferred in the order of E, D, and C. APS data d64 illustrated in FIG. 37D is transferred from the node E to the node F.

The APS data transferred in the order of the nodes B, A, and F is similar to the APS data d51 illustrated in FIG. 35A. The APS data transferred from the node B to the node C is similar to the APS data d52 illustrated in FIG. 35B.

The APS data transferred in the order of the nodes C, D, and E is similar to the APS data d53 illustrated in FIG. 35C. The APS data transferred from the node C to the node B is similar to the APS data d54 illustrated in FIG. 35D.

In the APS data d61, code "1011" of SF-R is set as the bridge request code, the node E is set as the destination node, the node F is set as the source node, "1" (Long) is set as the L&S, and code "000" of idle is set as the status. The number of failures is set to "10".

In the APS data d62, code "1011" of SF-R is set as the bridge request code, the node E is set as the destination node, the node F is set as the source node, "0" (Short) is set as the L&S, and code "000" of idle is set as the status. The number of failures is set to "10".

In the APS data d63, code "1011" of SF-R is set as the bridge request code, the node F is set as the destination node, the node E is set as the source node, "1" (Long) is set as the L&S, and code "000" of idle is set as the status. The number of failures is set to "10".

In the APS data d64, code "1011" of SF-R is set as the bridge request code, the node F is set as the destination node, the node E is set as the source node, "0" (Short) is set as the L&S, and code "000" of idle is set as the status. The number of failures is set to "10".

Figure 38:
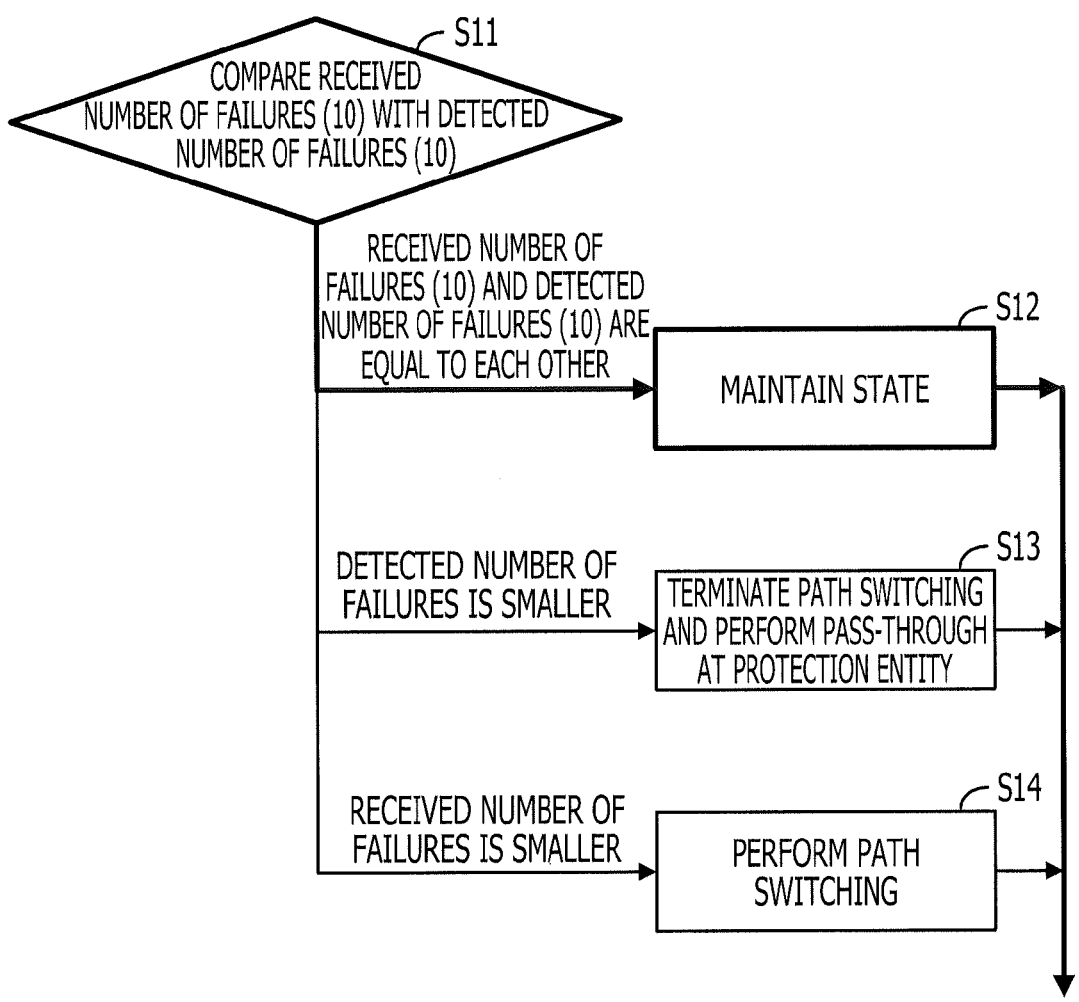
FIG. 38 is a flowchart illustrating restoration control.

FIG. 38 is a flowchart illustrating restoration control. In the flowchart, with respect to control performed by the nodes B and C and the nodes E and F during multiple failures in FIG. 36, specific numeric values of the numbers of failures to be compared are illustrated and the corresponding processing is denoted by bold line frames.

In the comparison processing in step S11, the nodes B and C and the nodes E and F compare the received number of failures with the detected number of failures. The received number of failures and the detected number of failures at the nodes B and C are "10" and the received number of failures and the detected number of failures at the nodes E and F are also "10". Thus, the process proceeds to processing in step S12 and the current state is maintained. That is, when the path switching is being executed, the path switching is continued, and when the pass-through is being executed, the pass-through is continued.

An example of the protection operation when the restoration processing in step S13 or S14 is selected in the flowchart illustrated in FIG. 33 will be described next with reference to FIGS. 39 to 43. A state when a single failure occurs is similar to the state illustrated in FIG. 34.

Figure 39:
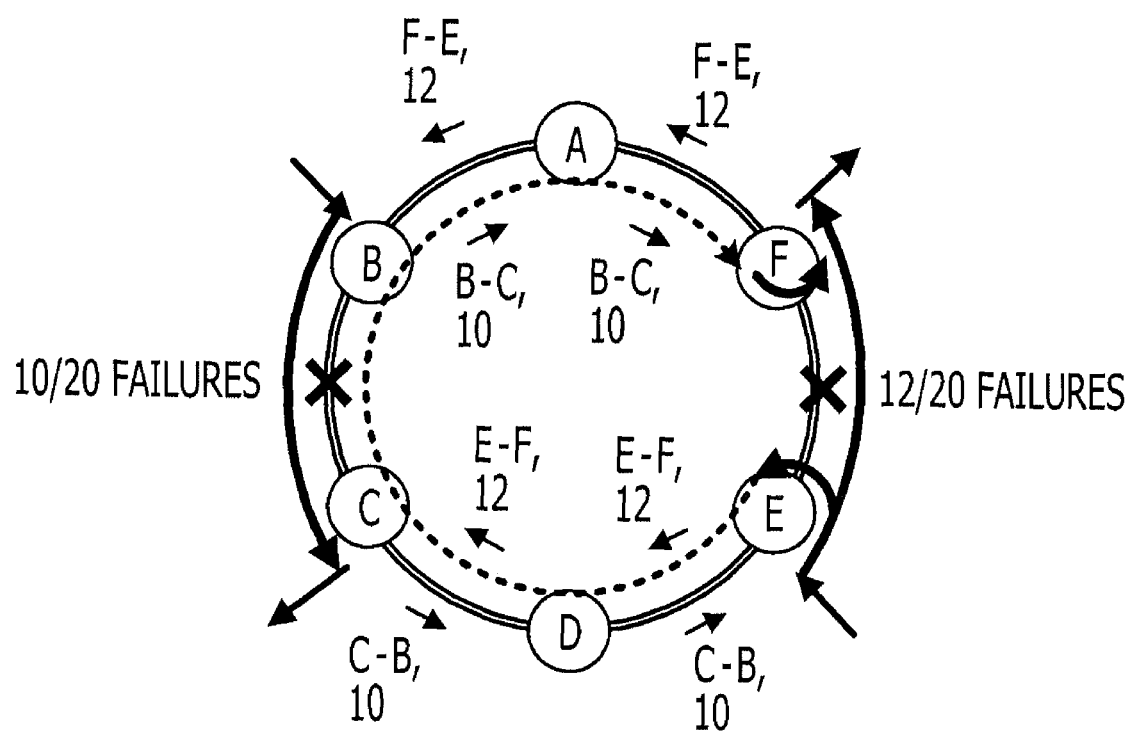
FIG. 39 illustrates a state in which the APS data is transferred when multiple failures occur.

FIG. 39 illustrates a state in which APS data is transferred when multiple failures occur. It is assumed, in the state illustrated in FIG. 34, failures further occur in 12 of the 20 wavelengths between the nodes E and F. Thus, upon detecting the failures, the node F transmits APS data "F-E,12" to the node E along a long route that goes through the nodes A, B, C, and D. Similarly, the node E transfers APS data "E-F,12" to the node F along a long route that goes through the nodes D, C, B, and A.

In the restoration processing when multiple failures as illustrated in FIG. 39 occur, the nodes B and C terminate path switching previously executed and perform pass-through and the nodes E and F perform path switching (described below with reference to FIGS. 42 and 43).

FIGS. 40A to 40D and FIGS. 41A to 41D illustrate values of APS data. APS data d71 illustrated in FIG. 40A is transferred in the order of B, A, and F. APS data d72 illustrated in FIG. 40B is transferred from the node B to the node C. APS data d73 illustrated in FIG. 40C is transferred in the order of C, D, and E. APS data d74 illustrated in FIG. 40D is transferred from the node C to the node B.

In the APS data d71, code "1011" of SF-R is set as the bridge request code, the node C is set as the destination node, the node B is set as the source node, "1" (Long) is set as the L&S, and code "000" of idle is set as the status. The number of failures is set to "10".

In the APS data d72, code "1011" of SF-R is set as the bridge request code, the node C is set as the destination node, the node B is set as the source node, "0" (Short) is set as the L&S, and code "000" of idle is set as the status. The number of failures is set to "10".

In the APS data d73, code "1011" of SF-R is set as the bridge request code, the node B is set as the destination node, the node C is set as the source node, "1" (Long) is set as the L&S, and code "000" of idle is set as the status. The number of failures is set to "10".

In the APS data d74, code "1011" of SF-R is set as the bridge request code, the node B is set as the destination node, the node C is set as the source node, "0" (Short) is set as the L&S, and code "000" of idle is set as the status. The number of failures is set to "10".

APS data d75 illustrated in FIG. 41A is transferred in the order of F, A, and B. APS data d76 illustrated in FIG. 41B is transferred from the node F to the node E. APS data d77 illustrated in FIG. 41C is transferred in the order of E, D, and C. APS data d78 illustrated in FIG. 41D is transferred from the node E to the node F.

In the APS data d75, code "1011" of SF-R is set as the bridge request code, the node E is set as the destination node, the node F is set as the source node, "1" (Long) is set as the L&S, and code "010" of br&sw is set as the status. The number of failures is set to "12".

In the APS data d76, code "1011" of SF-R is set as the bridge request code, the node E is set as the destination node, the node F is set as the source node, "0" (Short) is set as the L&S, and code "010" of br&sw is set as the status. The number of failures is set to "12".

In the APS data d77, code "1011" of SF-R is set as the bridge request code, the node F is set as the destination node, the node E is set as the source node, "1" (Long) is set as the L&S, and code "010" of br&sw is set as the status. The number of failures is set to "12".

In the APS data d78, code "1011" of SF-R is set as the bridge request code, the node F is set as the destination node, the node E is set as the source node, "0" (Short) is set as the L&S, and code "010" of br&sw is set as the status. The number of failures is set to "12".

Figure 42:
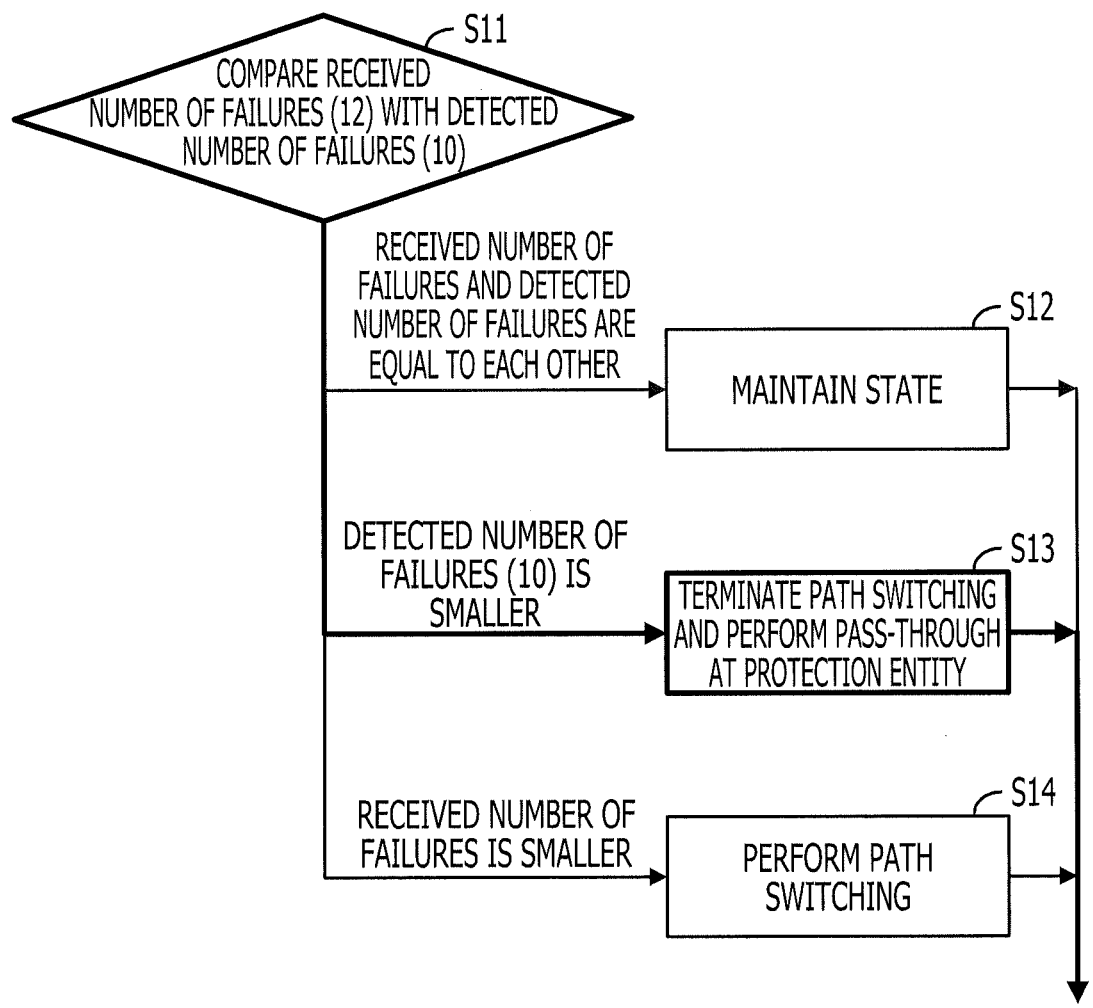
FIG. 42 is a flowchart illustrating restoration control.

FIG. 42 is a flowchart illustrating restoration control. In the flowchart, with respect to control performed by the nodes B and C during multiple failures in FIG. 39, specific numeric values of the numbers of failures to be compared are illustrated and the corresponding processing is denoted by bold line frames.

In the comparison processing in step S11, the nodes B and C compare the received number of failures with the detected number of failures. In this case, the received number of failures is 12 and the detected number of failures is 10. Thus, the process proceeds to step S13 in which the path switching is terminated since the nodes B and C have been performing the path switching and pass-through is performed at the protection entity.

Figure 43:
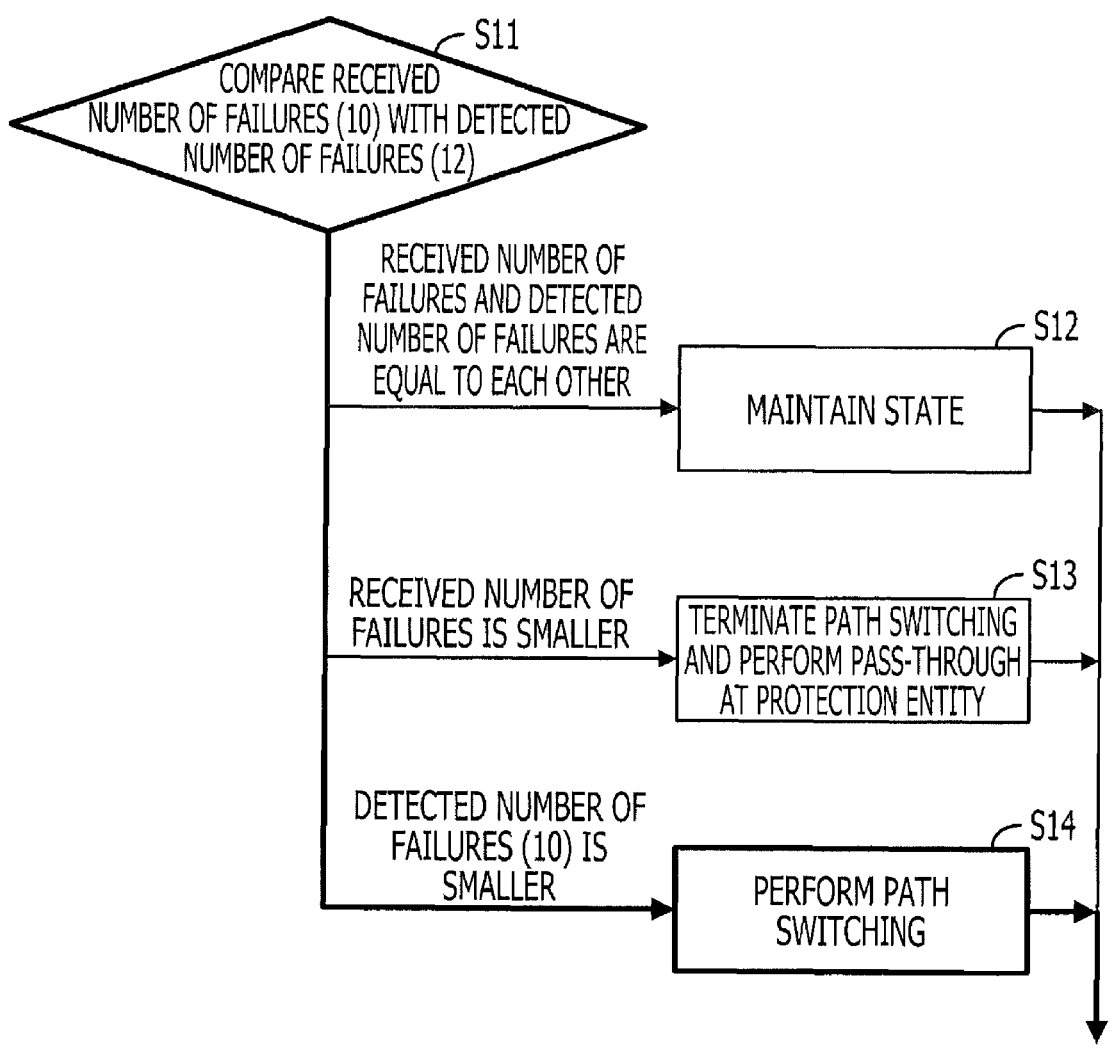
FIG. 43 is a flowchart illustrating restoration control.

FIG. 43 is a flowchart illustrating restoration control. In the flowchart, with respect to control performed by the nodes E and F during multiple failures in FIG. 39, specific numeric values of the numbers of failures to be compared are illustrated and the corresponding processing is denoted by bold line frames.

In the comparison processing in step S11, the nodes E and F compare the received number of failures with the detected number of failures. In this case, the received number of failures is 10 and the detected number of failures is 12. Thus, the process proceeds to processing in step S14 and the path switching is executed.

Figure 44:
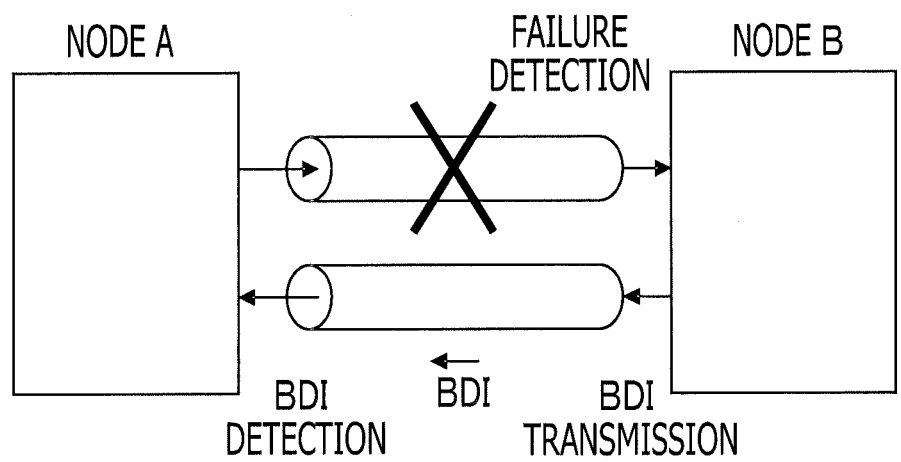
FIG. 44 illustrates counting of the number of failures.

Counting of the number of failures will be described next. FIG. 44 illustrates counting of the number of failures. In a ring network, signals in two directions are processed as a pair. When one of the paired signals fails, failure counting is performed regarding that the paired signals have failed.

For example, when a failure occurs in one direction between the nodes A and B, the node B located downstream of the failure detects the failure from an HO-ODU flowing over the corresponding wavelength. An ODUk PM BDI (ODUk Path Monitoring Backward Defect Indication) signal is caused to flow in the opposite direction (i.e., from the node B to the node A). Upon detection of the failure from the HO-ODU or upon detection of the BDI, the pair of signals is recognized as having a failure. Each number of failures is counted based on a failure in the pair of signals.

As described above, according to the present technology, even when multiple failures occur in some of wavelengths in a group for which the path switching is performed at a time, a large number of paths can be saved without disconnection of all of the paths.

In the embodiment describe above, the node 10 includes, for example, a processor, a memory, a logic circuit, and an optical communication interface. The processor is a device for processing data. Examples of the processor include a CPU (central processing unit) and a DSP (digital signal processor). The memory is a device that stores data. Examples of the memory include a ROM (read only memory) and a RAM (random access memory). The logic circuit is an electronic circuit that performs logic operations. Examples of the logic circuit include an LSI (large-scale integration), an FPGA (field-programmable gate array), and an ASIC (application specific integrated circuit). The optical communication interface is a device that transmits/receives optical signals to/from another node connected through optical fibers.

In the embodiment described above, those pieces of hardware may realize the functions of the node 10 illustrated in FIG. 10. For example, the optical communication interface may realize the dividers and the couplers. The processor, the memory, and the logic circuit may realize the reception terminating unit, the switch unit, the transmission terminating unit, and the switching control unit.

Although the particular embodiment has been exemplified above, the elements in the embodiment may be replaced with other elements having similar functions. Another arbitrary structure or process may also be added to the above-described embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transmission apparatus comprising:
   a memory; and
   a processor coupled to the memory, the processor being configured to:
   recognize a number of working failures and a number of protection failures between each pair of nodes in a network for transmission of wavelength-multiplexed signal light, the number of working failures being a number of failures in signal light in wavelengths along a working path between each pair of nodes and the number of protection failures being a number of failures in signal light in wavelengths along a protection path between each pair of nodes;
   when a working failure or a protection failure occurs at one or more wavelengths of the wavelength-multiplexed signal light between only one pair of nodes of the network, perform path switching between the working path and the protection path for the only one pair of nodes for all of the wavelengths of the wavelength-multiplexed signal light; and
   when a working failure or a protection failure occurs at one or more wavelengths of the wavelength-multiplexed signal light between more than one pair of nodes of the network, perform path switching between the working path and the protection path for only one pair of the more than one pair of nodes based on the recognized number of working failures and number of protection failures for each of the respective pair of nodes.

2. The transmission apparatus according to claim 1, wherein, the processor compares a first sum of a received number of working failures and a received number of protection failures, a second sum of a detected number of working failures and a detected number of protection failures, and a third sum of the received number of working failures and the detected number of working failures, the received number of working failures being the number of working failures which is transmitted from another apparatus and received, the received number of protection failures being the number of protection failures which is transmitted from the other apparatus and received, the detected number of working failures being the number of working failures which is detected by the transmission apparatus, and the detected number of protection failures being the number of protection failures which is detected by the transmission apparatus; and
   wherein, in a case in which the third sum is smallest, when the path switching is being executed, the processor terminates the path switching as the restoration processing, and when pass-through is being executed, the processor terminates the pass-through as the restoration processing,
   in a case in which the first sum and the second sum have the same value and are smallest, the processor maintains the currently executed restoration processing as the restoration processing,
   in a case in which the second sum is smaller than any other sums, when the path switching is being executed, the processor terminates the path switching and executes the pass-through as the restoration processing, and
   in a case in which the first sum is smaller than any other sums, the processor executes the path switching as the restoration processing.

3. A transmission apparatus comprising:
   a memory; and
   a processor coupled to the memory, the processor being configured to:
   recognize a number of failures in between each pair of nodes in a network for transmission of wavelength-multiplexed signal light;
   when a failure occurs at one or more wavelengths of the wavelength-multiplexed signal light between only one pair of nodes of the network, perform path switching between a working path and a protection path for the only one pair of nodes for all of the wavelengths of the wavelength-multiplexed signal light; and
   when a failure occurs at one or more wavelengths of the wavelength-multiplexed signal light between more than one pair of nodes of the network, perform path switching between the working path and the protection path for only one pair of the more than one pair of nodes based on the recognized number of failures for each of the respective pair of nodes.

4. The transmission apparatus according to claim 3, wherein, the processor compares a received number of failures with a detected number of failures, the received number of failures being the number of failures which is transmitted from another apparatus and received and the detected number of failures being the number of failures which is detected by the transmission apparatus; and
   wherein, in a case in which the received number of failures and the detected number of failures are equal to each other, the processor maintains the currently executed restoration processing as the restoration processing,
   in a case in which the detected number of failures is smaller than the received number of failures, when the path switching is being executed, the processor terminates the path switching and executes pass-through as the restoration processing, and
   in a case in which the received number of failures is smaller than the detected number of failures, the processor executes the path switching as the restoration processing.

5. A network protection method for a transmission apparatus, the method comprising:

recognizing a number of working failures and a number of protection failures between each pair of nodes in a network for transmission of wavelength-multiplexed signal light, the number of working failures being the number of failures in signal light in wavelengths along a working path between each pair of nodes and the number of protection failures being a number of failures in signal light in wavelengths along a protection path between each pair of nodes;

when a failure occurs at one or more wavelengths of the wavelength-multiplexed signal light between only one pair of nodes of the network, performing, by a processor, path switching between the working path and the protection path for the only one pair of nodes for all of the wavelengths of the wavelength-multiplexed signal light; and when a working failure or a protection failure occurs at one or more wavelengths of the wavelength-multiplexed signal light between more than one pair of nodes of the network, performing path switching between the working path and the protection path for only one pair of the more than one pair of nodes based on the recognized number of working failures and number of protection failures for each of the respective pair of nodes.

6. The network protection method according to claim 5, wherein a first sum of a received number of working failures and a received number of protection failures, a second sum of a detected number of working failures and a detected number of protection failures, and a third sum of the received number of working failures and the detected number of working failures are compared with each other, the received number of working failures being the number of working failures which is transmitted from another apparatus and received, the received number of protection failures being the number of protection failures which is transmitted from the other apparatus and received, the detected number of working failures being the number of working failures which is detected by the transmission apparatus, and the detected number of protection failures being the number of protection failures which is detected by the transmission apparatus; and wherein, in a case in which the third sum is smallest, when the path switching is being executed, the path switching is terminated as the restoration processing, and when pass-through is being executed, the pass-through is terminated as the restoration processing, in a case in which the first sum and the second sum have the same value and are smallest, the currently executed restoration processing is maintained as the restoration processing, in a case in which the second sum is smaller than any other sums, when the path switching is being executed, the path switching is terminated and the pass-through is executed as the restoration processing, and in a case in which the first sum is smaller than any other sums, the path switching is executed as the restoration processing.

7. A transmission method comprising:

recognizing a number of working failures and a number of protection failures between each pair of nodes in a network for transmission of wavelength-multiplexed signal light, the number of working failures being the number of failures in signal light in wavelengths along a working path between each pair of nodes and the number of protection failures being a number of failures in signal light in wavelengths along a protection path between each pair of nodes;

when a failure occurs at one or more wavelengths of the wavelength-multiplexed signal light between only one pair of nodes of the network, performing, by a processor, path switching between the working path and the protection path for the only one pair of nodes for all of the wavelengths of the wavelength-multiplexed signal light; and when a working failure or a protection failure occurs at one or more wavelengths of the wavelength-multiplexed signal light between more than one pair of nodes of the network, performing path switching between the working path and the protection path for only one pair of the more than one pair of nodes based on the recognized number of working failures and number of protection failures for each of the respective pair of nodes.

* * * * *